(12) United States Patent
Neumeier et al.

(10) Patent No.: US 10,902,048 B2
(45) Date of Patent: Jan. 26, 2021

(54) PREDICTION OF FUTURE VIEWS OF VIDEO SEGMENTS TO OPTIMIZE SYSTEM RESOURCE UTILIZATION

(71) Applicant: INSCAPE DATA, INC., Irvine, CA (US)

(72) Inventors: Zeev Neumeier, Berkeley, CA (US); Michael Collette, San Rafael, CA (US)

(73) Assignee: INSCAPE DATA, INC., Irvine, CA (US)

( * ) Notice: Subject to any disclaimer, the term of this patent is extended or adjusted under 35 U.S.C. 154(b) by 800 days.

(21) Appl. No.: 15/211,991

(22) Filed: Jul. 15, 2016

(65) Prior Publication Data

US 2017/0017652 A1      Jan. 19, 2017

Related U.S. Application Data

(60) Provisional application No. 62/193,331, filed on Jul. 16, 2015.

(51) Int. Cl.
  *G06F 16/00*    (2019.01)
  *G06F 16/48*    (2019.01)
  (Continued)

(52) U.S. Cl.
  CPC .......... *G06F 16/48* (2019.01); *G06F 11/1464* (2013.01); *G06F 16/71* (2019.01);
  (Continued)

(58) Field of Classification Search
  CPC ............................... G06F 16/48; G06F 16/783
  (Continued)

(56) References Cited

U.S. PATENT DOCUMENTS

| 4,677,466 A | 6/1987 | Lert, Jr. et al. |
| 4,697,209 A | 9/1987 | Kiewit et al. |

(Continued)

FOREIGN PATENT DOCUMENTS

| CA | 2501316 | 9/2005 |
| CN | 1557096 | 12/2004 |

(Continued)

OTHER PUBLICATIONS

"Cache Policies for cloud-based systems: To Keep or Not to Keep"; By: Nicolas Le Scouarnec; Published 2014 https://ieeexplore.ieee.org/stamp/stamp.jsp?tp=&arnumber=6973717.*

(Continued)

*Primary Examiner* — Chelcie L Daye
(74) *Attorney, Agent, or Firm* — Polsinelli LLP

(57) ABSTRACT

Provided are devices, computer-program products, and methods for improved management of system resources in a matching system. For example, examples can increase the efficiency of system resource utilization by managing the duration that data related to video segments are retained based on data that takes into account an identified popularity of a video segment. The identified popularity can be determined by algorithms that take into account numbers of viewers who watched the video segment, ratings of the video segment, metrics derived from remote sources, or any other factor that can indicate likelihood that the video segment will be viewed.

18 Claims, 13 Drawing Sheets

(51) Int. Cl.
*H04N 21/24* (2011.01)
*H04N 21/25* (2011.01)
*G06F 16/71* (2019.01)
*G06F 16/783* (2019.01)
*G06F 11/14* (2006.01)
*G06N 7/00* (2006.01)

(52) U.S. Cl.
CPC .......... *G06F 16/783* (2019.01); *G06N 7/005* (2013.01); *H04N 21/2407* (2013.01); *H04N 21/252* (2013.01)

(58) Field of Classification Search
USPC ....................................................... 707/640
See application file for complete search history.

(56) References Cited

U.S. PATENT DOCUMENTS

| | | |
|---|---|---|
| 4,739,398 A | 4/1988 | Thomas et al. |
| 5,019,899 A | 5/1991 | Boles et al. |
| 5,319,453 A | 6/1994 | Copriviza et al. |
| 5,436,653 A | 7/1995 | Ellis et al. |
| 5,481,294 A | 1/1996 | Thomas et al. |
| 5,557,334 A | 9/1996 | Legate |
| 5,572,246 A | 11/1996 | Ellis et al. |
| 5,812,286 A | 9/1998 | Li |
| 5,826,165 A | 10/1998 | Echeita et al. |
| 5,918,223 A | 6/1999 | Blum et al. |
| 6,008,802 A | 12/1999 | Goldschmidt et al. |
| 6,035,177 A | 3/2000 | Moses et al. |
| 6,064,764 A | 5/2000 | Bhaskaran et al. |
| 6,381,362 B1 | 4/2002 | Deshpande et al. |
| 6,415,438 B1 | 7/2002 | Blackketter et al. |
| 6,463,585 B1 | 10/2002 | Hendricks et al. |
| 6,469,749 B1 | 10/2002 | Dimitrova |
| 6,577,346 B1 | 6/2003 | Perlman |
| 6,577,405 B2 | 6/2003 | Kranz et al. |
| 6,628,801 B2 | 9/2003 | Powell et al. |
| 6,647,548 B1 | 11/2003 | Lu et al. |
| 6,675,174 B1 | 1/2004 | Bolle et al. |
| 6,771,316 B1 | 8/2004 | Iggulden |
| 6,804,659 B1 | 10/2004 | Graham et al. |
| 6,978,470 B2 | 12/2005 | Swix et al. |
| 6,990,453 B2 | 1/2006 | Wang et al. |
| 7,028,327 B1 | 4/2006 | Dougherty et al. |
| 7,039,930 B1 | 5/2006 | Goodman et al. |
| 7,050,068 B1 | 5/2006 | Bastos et al. |
| 7,051,351 B2 | 5/2006 | Goldman et al. |
| 7,064,796 B2 | 6/2006 | Roy et al. |
| 7,089,575 B2 | 8/2006 | Agnihotri et al. |
| 7,136,875 B2 | 11/2006 | Anderson et al. |
| 7,210,157 B2 | 4/2007 | Devara |
| 7,346,512 B2 | 3/2008 | Wang et al. |
| 7,421,723 B2 | 9/2008 | Harkness et al. |
| 7,590,998 B2 | 9/2009 | Hanley |
| 7,623,823 B2 | 11/2009 | Zito et al. |
| 7,793,318 B2 | 9/2010 | Deng |
| 7,933,451 B2 | 4/2011 | Kloer |
| 8,001,571 B1 | 8/2011 | Schwartz et al. |
| 8,094,872 B1 | 1/2012 | Yagnik et al. |
| 8,171,004 B1 | 5/2012 | Kaminski, Jr. et al. |
| 8,171,030 B2 | 5/2012 | Peira et al. |
| 8,175,413 B1 | 5/2012 | Ioffe et al. |
| 8,189,945 B2 | 5/2012 | Stojancic et al. |
| 8,195,689 B2 | 6/2012 | Ramanathan et al. |
| 8,229,227 B2 | 7/2012 | Stojancic et al. |
| 8,335,786 B2 | 12/2012 | Peira et al. |
| 8,364,703 B2 | 1/2013 | Ramanathan et al. |
| 8,385,644 B2 | 2/2013 | Stojancic et al. |
| 8,392,789 B2 | 3/2013 | Biscondi et al. |
| 8,494,234 B1 | 7/2013 | Djordjevic et al. |
| 8,522,283 B2 | 8/2013 | Laligand et al. |
| 8,595,781 B2 | 11/2013 | Neumeier et al. |
| 8,625,902 B2 | 1/2014 | Baheti et al. |
| 8,769,854 B1 | 7/2014 | Battaglia |
| 8,776,105 B2 | 7/2014 | Sinha et al. |
| 8,832,723 B2 | 9/2014 | Sinha et al. |
| 8,856,817 B2 | 10/2014 | Sinha et al. |
| 8,893,167 B2 | 11/2014 | Sinha et al. |
| 8,893,168 B2 | 11/2014 | Sinha et al. |
| 8,898,714 B2 | 11/2014 | Neumeier et al. |
| 8,918,804 B2 | 12/2014 | Sinha et al. |
| 8,918,832 B2 | 12/2014 | Sinha et al. |
| 8,930,980 B2 | 1/2015 | Neumeier et al. |
| 8,959,202 B2 | 2/2015 | Haitsma et al. |
| 9,055,309 B2 | 6/2015 | Neumeier et al. |
| 9,055,335 B2 | 6/2015 | Neumeier et al. |
| 9,071,868 B2 | 6/2015 | Neumeier et al. |
| 9,094,714 B2 | 7/2015 | Neumeier et al. |
| 9,094,715 B2 | 7/2015 | Neumeier et al. |
| 9,449,090 B2 | 9/2016 | Neumeier et al. |
| 9,465,867 B2 | 10/2016 | Hoarty |
| 2001/0039658 A1 | 11/2001 | Walton |
| 2001/0044992 A1 | 11/2001 | Jahrling |
| 2002/0026635 A1 | 2/2002 | Wheeler et al. |
| 2002/0054695 A1 | 5/2002 | Bjorn et al. |
| 2002/0056088 A1 | 5/2002 | Silva, Jr. et al. |
| 2002/0059633 A1 | 5/2002 | Harkness et al. |
| 2002/0100041 A1 | 7/2002 | Rosenberg et al. |
| 2002/0105907 A1 | 8/2002 | Bruekers et al. |
| 2002/0120925 A1 | 8/2002 | Logan |
| 2002/0122042 A1 | 9/2002 | Bates |
| 2002/0162117 A1 | 10/2002 | Pearson et al. |
| 2002/0162118 A1 | 10/2002 | Levy et al. |
| 2003/0026422 A1 | 2/2003 | Gerheim et al. |
| 2003/0086341 A1 | 5/2003 | Wells |
| 2003/0121037 A1 | 6/2003 | Swix et al. |
| 2003/0121046 A1 | 6/2003 | Roy et al. |
| 2003/0147561 A1 | 8/2003 | Faibish et al. |
| 2003/0188321 A1 | 10/2003 | Shoff et al. |
| 2004/0045020 A1 | 3/2004 | Witt et al. |
| 2004/0059708 A1 | 3/2004 | Dean et al. |
| 2004/0216171 A1 | 10/2004 | Barone et al. |
| 2004/0221237 A1 | 11/2004 | Foote et al. |
| 2004/0226035 A1 | 11/2004 | Hauser |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0172312 A1 | 8/2005 | Lienhart et al. |
| 2005/0207416 A1 | 9/2005 | Rajkotia |
| 2005/0209065 A1 | 9/2005 | Schlosser et al. |
| 2005/0235318 A1 | 10/2005 | Grauch et al. |
| 2006/0029368 A1 | 2/2006 | Harville |
| 2006/0031914 A1 | 2/2006 | Dakss et al. |
| 2006/0133647 A1 | 6/2006 | Werner et al. |
| 2006/0153296 A1 | 7/2006 | Deng |
| 2006/0155952 A1 | 7/2006 | Haas |
| 2006/0173831 A1 | 8/2006 | Basso et al. |
| 2006/0187358 A1 | 8/2006 | Lienhart et al. |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0094696 A1 | 4/2007 | Sakai |
| 2007/0109449 A1 | 5/2007 | Cheung |
| 2007/0113263 A1 | 5/2007 | Chatani |
| 2007/0139563 A1 | 6/2007 | Zhong |
| 2007/0143796 A1 | 6/2007 | Malik |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0250901 A1 | 10/2007 | McIntire et al. |
| 2007/0261070 A1 | 11/2007 | Brown et al. |
| 2007/0261075 A1 | 11/2007 | Glasberg |
| 2007/0271300 A1 | 11/2007 | Ramaswamy |
| 2007/0274537 A1 | 11/2007 | Srinivasan |
| 2007/0300280 A1 | 12/2007 | Turner et al. |

(56) References Cited

U.S. PATENT DOCUMENTS

| | | |
|---|---|---|
| 2008/0044102 A1 | 2/2008 | Ekin |
| 2008/0046945 A1 | 2/2008 | Hanley |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0208891 A1 | 8/2008 | Wang et al. |
| 2008/0240562 A1 | 10/2008 | Fukuda et al. |
| 2008/0263620 A1 | 10/2008 | Berkvens et al. |
| 2008/0276266 A1 | 11/2008 | Huchital et al. |
| 2008/0310731 A1 | 12/2008 | Stojancic et al. |
| 2008/0313140 A1 | 12/2008 | Pereira et al. |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0213270 A1 | 8/2009 | Ismert et al. |
| 2009/0235312 A1 | 9/2009 | Morad et al. |
| 2010/0010648 A1 | 1/2010 | Bull et al. |
| 2010/0083299 A1 | 4/2010 | Nelson |
| 2010/0115543 A1 | 5/2010 | Falcon |
| 2010/0125870 A1 | 5/2010 | Ukawa et al. |
| 2010/0166257 A1 | 7/2010 | Wredenhagen |
| 2010/0199295 A1 | 8/2010 | Katpelly et al. |
| 2010/0235486 A1 | 9/2010 | White et al. |
| 2010/0269138 A1 | 10/2010 | Krikorian et al. |
| 2010/0306805 A1 | 12/2010 | Neumeier et al. |
| 2010/0306808 A1 | 12/2010 | Neumeier et al. |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1 | 4/2011 | Voloshynovskiy et al. |
| 2011/0251987 A1 | 4/2011 | Buchheit |
| 2011/0247042 A1 | 10/2011 | Mallinson |
| 2011/0289099 A1 | 11/2011 | Quan |
| 2011/0299770 A1 | 12/2011 | Vaddadi et al. |
| 2012/0017240 A1 | 1/2012 | Shkedi |
| 2012/0054143 A1 | 3/2012 | Doig et al. |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka |
| 2012/0272259 A1 | 10/2012 | Cortes |
| 2012/0317240 A1 | 12/2012 | Wang |
| 2012/0324494 A1 | 12/2012 | Burger et al. |
| 2013/0007191 A1 | 1/2013 | Klappert et al. |
| 2013/0007792 A1* | 1/2013 | Jeon .................. G06F 16/40 725/14 |
| 2013/0042262 A1 | 2/2013 | Riethmueller |
| 2013/0054356 A1 | 2/2013 | Richman et al. |
| 2013/0067523 A1 | 3/2013 | Etsuko et al. |
| 2013/0070847 A1 | 3/2013 | Iwamoto et al. |
| 2013/0139209 A1 | 5/2013 | Urrabazo et al. |
| 2013/0202150 A1 | 8/2013 | Sinha et al. |
| 2013/0209065 A1 | 8/2013 | Yeung |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0025837 A1* | 1/2014 | Swenson .......... H04N 21/23439 709/231 |
| 2014/0082663 A1 | 3/2014 | Neumeier et al. |
| 2014/0088742 A1 | 3/2014 | Srinivasan |
| 2014/0130092 A1 | 5/2014 | Kunisetty |
| 2014/0188487 A1 | 7/2014 | Perez Gonzalez |
| 2014/0193027 A1 | 7/2014 | Scherf et al. |
| 2014/0195548 A1 | 7/2014 | Harron |
| 2014/0201769 A1 | 7/2014 | Neumeier et al. |
| 2014/0201772 A1* | 7/2014 | Neumeier .......... H04N 21/44213 725/19 |
| 2014/0219554 A1 | 8/2014 | Yamaguchi et al. |
| 2014/0237576 A1 | 8/2014 | Zhang |
| 2014/0258375 A1 | 9/2014 | Munoz |
| 2014/0270489 A1 | 9/2014 | Jaewhan et al. |
| 2014/0270504 A1 | 9/2014 | Baum et al. |
| 2014/0270505 A1 | 9/2014 | McCarthy |
| 2014/0282671 A1 | 9/2014 | McMillan |
| 2014/0344880 A1 | 11/2014 | Geller et al. |
| 2015/0100979 A1 | 4/2015 | Moskowitz et al. |
| 2015/0112988 A1 | 4/2015 | Pereira et al. |
| 2015/0163545 A1 | 6/2015 | Freed et al. |
| 2015/0181311 A1 | 6/2015 | Navin et al. |
| 2015/0382075 A1 | 12/2015 | Neumeier et al. |
| 2016/0227261 A1 | 8/2016 | Neumeier et al. |
| 2016/0286244 A1 | 9/2016 | Chang et al. |
| 2017/0017645 A1 | 1/2017 | Neumeier et al. |
| 2017/0017651 A1 | 1/2017 | Neumeier et al. |
| 2017/0017652 A1 | 1/2017 | Neumeier et al. |
| 2017/0019716 A1 | 1/2017 | Neumeier et al. |
| 2017/0019719 A1 | 1/2017 | Neumeier et al. |
| 2017/0026671 A1 | 1/2017 | Neumeier et al. |
| 2017/0032033 A1 | 2/2017 | Neumeier et al. |
| 2017/0032034 A1 | 2/2017 | Neumeier et al. |
| 2017/0134770 A9 | 5/2017 | Neumeier et al. |
| 2017/0186042 A1 | 6/2017 | Wong et al. |

FOREIGN PATENT DOCUMENTS

| | | |
|---|---|---|
| CN | 101162470 | 4/2008 |
| CN | 1681304 | 7/2010 |
| CN | 102377960 | 3/2012 |
| EP | 248 533 | 8/1994 |
| EP | 1578126 | 9/2005 |
| EP | 2 084 624 | 8/2009 |
| EP | 2 352 289 | 8/2011 |
| EP | 2 541 963 A2 | 1/2013 |
| GB | 2457694 | 8/2009 |
| WO | 0144992 | 6/2001 |
| WO | 2005/101998 | 11/2005 |
| WO | 2007/114796 | 10/2007 |
| WO | 2008/065340 A1 | 6/2008 |
| WO | 2009/131861 | 10/2009 |
| WO | 2009/150425 | 12/2009 |
| WO | 2010/135082 | 11/2010 |
| WO | 2011/090540 A2 | 7/2011 |
| WO | 2012/057724 | 5/2012 |
| WO | 2012/108975 | 8/2012 |
| WO | 2012/170451 | 12/2012 |
| WO | 2014/142758 | 9/2014 |
| WO | 2014/145929 A1 | 9/2014 |
| WO | 2015/100372 A1 | 7/2015 |
| WO | 2016/123495 | 8/2016 |
| WO | 2016/168556 | 10/2016 |
| WO | 2017/011758 | 1/2017 |
| WO | 2017/011792 | 1/2017 |

OTHER PUBLICATIONS

International Search Report and Written Opinion dated Mar. 31, 2015 for PCT Application No. PCT/US2014/072255, 8 pages.

International Search Report and Written Opinion dated Apr. 26, 2016 for PCT Application No. PCT/US2016/015681,13 pages.

"How to: Watch from the beginning |About DISH" (Dec. 31, 2014) XP055265764, retrieved on Apr. 15, 2016 from URL:http://about.dish.com/blog/hopper/how-watch-beginning 2 pages.

International Search Report and Written Opinion dated Jun. 24, 2016 for PCT Application No. PCT/US2016/027691, 13 pages.

Gionis et al., "Similarity Search in High Dimension via Hashing", Proceedings of the 25th VLDB Conference, 1999, 12 pages.

Huang , "Bounded Coordinate System Indexing for Real-time Video Clip Search", Retrieved from the Internet:URL:http://staff.itee.uq.edu.aujzxf/papers/TOIS.pdf, Jan. 1, 2009, 32 pages.

Kim et al., "Edge-Based Spatial Descriptor Using Color Vector Angle for Effective Image Retrieval", Modeling Decisions for

(56) References Cited

OTHER PUBLICATIONS

Artificial Intelligence; [Lecture Notes in Computer Science; Lecture Notes in Artificial Intelligence, Jul. 1, 2005, pp. 365-375.
Liu et al., "Near-duplicate video retrieval", ACM Computing Surveys, vol. 45, No. 4, Aug. 30, 2013, pp. 1-23.
International Search Report and Written Opinion dated Oct. 12, 2016 for PCT Application No. PCT/US2016/042522,13 pages.
International Search Report and Written Opinion dated Oct. 11, 2016 for PCT Application No. PCT/US2016/042621, 13 pages.
International Search Report and Written Opinion dated Oct. 20, 2016 for PCT Application No. PCT/US2016/042611,12 pages.
Scouarnec et al., "Cache policies for cloud-based systems:To keep or not to keep", 2014 IEEE 7th International Conference on Cloud Computing, IEEE XP032696624, Jun. 27, 2014, pp. 1-8.
International Search Report and Written Opinion dated Oct. 25, 2016 for PCT Application No. PCT/US2016/042564, 14 pages.
Anonymous; "Cache (computing)" Wikipedia, the free encyclopedia, URL:http://en.wikipedia.org/w/index.phpti tle=Cache (computing) &oldid=474222804, Jan. 31, 2012; 6 pages.
International Search Report and Written Opinion dated Oct. 24, 2016 for PCT Application No. PCT/US2016/042557, 11 pages.
Anil K. Jain, "Image Coding via a Nearest Neighbors Image Model" IEEE Transactions on Communications, vol. Com-23, No. 3, Mar. 1975, pp. 318-331.
Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.
Li et al., A Confidence Based Recognition System for TV Commercial Extraction, Conferences in Research and Practice in Information Technology vol. 75, 2008.
International Search Report and Written Opinion dated Jul. 27, 2011 for PCT Application No. PCT/US2010/057153, 8 pages.
International Search Report and Written Opinion dated Aug. 31, 2011 for PCT Application No. PCT/US2010/057155, 8 pages.
International Search Report and Written Opinion dated Aug. 26, 2014 for PCT Application No. PCT/US2014/030782; 11 pages.
International Search Report and Written Opinion dated Jul. 21, 2014 for PCT Application No. PCT/US2014/030795; 10 pages.
International Search Report and Written Opinion, dated Jul. 25, 2014 for PCT Application No. PCT/US2014/030805, 10 pages.
Extended European Search Report dated Mar. 7, 2013 for European Application No. 12178359.1, 8 pages.
Extended European Search Report dated Oct. 11, 2013 for European Application No. 10844152.8, 19 pages.
Kabal (P.), Ramachandran (R.P.): The computation of line spectral frequencies using Chebyshev polynomials, IEEE Trans. on ASSP, vol. 34, No. 6, pp. 1419-1426, 1986.
Itakura (F.): Line spectral representation of linear predictive coefficients of speech signals, J. Acoust. Soc. Amer., vol. 57, Supplement No. 1, S35, 1975, 3 pages.
Bistritz (Y.), Pellerm (S.): Immittance Spectral Pairs (ISP) for speech encoding, Proc. ICASSP'93, pp. 11-9 to 11-12.
International Search Report and Written Opinion dated Mar. 8, 2016 for PCT Application No. PCT/ US2015/062945; 9 pages.
Extended European Search Report dated Dec. 21, 2016 for European Application No. 14763506.4, 11 pages.
Extended European Search Report dated Nov. 23, 2016 for European Application No. 14764182.3, 10 pages.
Extended European Search Report dated Jan. 24, 2017 for European Application No. 14762850.7, 12 pages.
Extended European Search Report dated Jun. 16, 2017, for European Patent Application No. 14873564.0, 8 pages.
U.S. Appl. No. 14/551,933 , "Final Office Action", dated May 23, 2016, 19 pages.
U.S. Appl. No. 14/551,933 , "Non-Final Office Action", dated Oct. 17, 2016, 15 pages.
U.S. Appl. No. 14/551,933 , "Non-Final Office Action", dated Dec. 31, 2015, 24 pages.
U.S. Appl. No. 14/551,933 , "Notice of Allowance", dated Mar. 21, 2017, 8 pages.
U.S. Appl. No. 14/217,039 , "Non-Final Office Action", dated May 23, 2014, 27 pages.
U.S. Appl. No. 14/217,039 , "Final Office Action", dated Nov. 7, 2014, 15 pages.
U.S. Appl. No. 14/217,039 , "Notice of Allowance", dated Jan. 29, 2015, 8 pages.
U.S. Appl. No. 14/678,856 , "Non-Final Office Action", dated Dec. 1, 2015, 28 pages.
U.S. Appl. No. 14/678,856 , "Notice of Allowance", dated May 20, 2016, 9 pages.
U.S. Appl. No. 14/217,075, "Non-Final Office Action", dated Jul. 16, 2014, 39 pages.
U.S. Appl. No. 14/217,075, "Notice of Allowance ", dated Feb. 20, 2015, 51 pages.
U.S. Appl. No. 14/217,094, "Notice of Allowance ", dated Sep. 4, 2014, 30 pages.
U.S. Appl. No. 14/217,375, "Non-Final Office Action", dated Apr. 1, 2015, 39 pages.
U.S. Appl. No. 14/217,375, "Notice of Allowance", dated Apr. 1, 2015, 31 pages.
U.S. Appl. No. 14/217,425, "Non-Final Office Action", dated Apr. 7, 2015, 12 pages.
U.S. Appl. No. 14/217,425, "Notice of Allowance", dated May 20, 2015, 15 pages.
U.S. Appl. No. 14/217,435, "Non-Final Office Action", dated Nov. 24, 2014, 9 pages.
U.S. Appl. No. 14/217,435, "Notice of Allowance", dated Jun. 5, 2015, 9 pages.
U.S. Appl. No. 15/011,099 , "First Action Interview Office Action Summary", dated May 9, 2017, 6 pages.
U.S. Appl. No. 15/011,099 , "First Action Interview Pilot Program Pre-Interview Communication", dated Feb. 28, 2017, 5 pages.
U.S. Appl. No. 12/788,721 , "Non-Final Office Action", dated Mar. 28, 2012, 15 Pages.
U.S. Appl. No. 12/788,721 , "Final Office Action", dated Aug. 15, 2012, 22 Pages.
U.S. Appl. No. 12/788,721 , "Notice of Allowance", dated Aug. 15, 2013, 16 Pages.
U.S. Appl. No. 14/763,158 , "Non-Final Office Action", dated Jun. 27, 2016, 16 Pages.
U.S. Appl. No. 14/763,158 , "Final Office Action", dated Sep. 7, 2016, 12 Pages.
U.S. Appl. No. 14/763,158 , "Notice of Allowance", dated Mar. 17, 2016, 8 Pages.
U.S. Appl. No. 14/807,849 , "Non-Final Office Action", dated Nov. 25, 2015, 12 Pages.
U.S. Appl. No. 14/807,849 , "Final Office Action", dated Apr. 19, 2016, 13 pages.
U.S. Appl. No. 14/807,849 , "Non-Final Office Action", dated Feb. 28, 2017, 10 Pages.
U.S. Appl. No. 14/089,003 , "Notice of Allowance", dated Jul. 30, 2014, 24 Pages.
U.S. Appl. No. 12/788,748 , "Non-Final Office Action", dated Jan. 10, 2013, 10 Pages.
U.S. Appl. No. 12/788,748 , "Final Office Action", dated Nov. 21, 2013, 13 Pages.
U.S. Appl. No. 12/788,748 , "Notice of Allowance", dated Mar. 6, 2014, 7 Pages.
U.S. Appl. No. 14/953,994 , "Non-Final Office Action", dated Mar. 3, 2016, 34 Pages.
U.S. Appl. No. 14/953,994 , "Final Office Action", dated Jun. 1, 2016, 36 Pages.
U.S. Appl. No. 14/953,994 , "Notice of Allowance", dated Aug. 31, 2016, 15 Pages.
U.S. Appl. No. 14/807,849 , "Final Office Action", dated Jun. 22, 2017, 10 pages.
U.S. Appl. No. 15/011,099 , "Final Office Action", dated Jul. 24, 2017, 22 pages.
U.S. Appl. No. 15/240,801 , "Non-Final Office Action", dated Aug. 11, 2017, 18 pages.

(56) References Cited

OTHER PUBLICATIONS

U.S. Appl. No. 15/240,815 , "Non-Final Office Action", dated Aug. 23, 2017, 15 pages.
U.S. Appl. No. 15/211,345 , "First Action Interview Pilot Program Pre-Interview Communication", dated Sep. 19, 2017, 8 pages.

* cited by examiner

PREDICTION OF FUTURE VIEWS OF VIDEO SEGMENTS TO OPTIMIZE SYSTEM RESOURCE UTILIZATION

CROSS-REFERENCES TO RELATED APPLICATIONS

This application claims the benefit of U.S. Provisional Application No. 62/193,331, filed on Jul. 16, 2015, which is hereby incorporated by reference in its entirety. This application also incorporates by reference the following in their entirety: U.S. patent application Ser. No. 14/089,003, which was filed on Nov. 25, 2013, U.S. Provisional Application No. 61/182,334, which was filed on May 29, 2009, U.S. Provisional Application No. 61/290,714, which was filed on Dec. 29, 2009, U.S. application Ser. No. 12/788,748, which was filed on May 27, 2015, and U.S. application Ser. No. 12/788,721, which was filed on May 27, 2015.

FIELD

The present disclosure relates to improving management of system resources used for recognition of content displayed by a media system (e.g., a television system, a computer system, or other electronic device capable of connecting to the Internet). In some examples, various techniques and systems are provided for determining a likelihood that content will be displayed on a media system in a future period of time.

BACKGROUND

A media system (e.g., a television system, a computer system, or other electronic device capable of connecting to the Internet) can display content for a user viewing the media system. In some examples, the content displayed on the media system might be unknown to the media system, and any application run on the media system. For examples, the media system might display whatever the media system is given. In such examples, an identification of the content might not be sent to the media system. In other examples, the identification of the content might have been lost between when the remote system sent the content and when the media system received the content. By not knowing what is being displayed on the media system, opportunities to show similar or relevant additional content with the content on the media system becomes difficult.

One solution to identify content displayed on a media system is to use a matching system, which matches content displayed on the media system with reference content. However, in order to be able to match content, the matching system must include a large number of reference content. In addition, not only must the matching system have a large number of reference content, the matching system also must have the right reference content. Therefore, there is a need in the art for managing reference content for a matching system.

SUMMARY

Provided are devices, computer-program products, and methods for improved management of system resources in a matching system. For example, examples can increase the efficiency of system resource utilization by managing the duration that data related to video segments are retained based on data that takes into account an identified popularity of a video segment. The identified popularity can be determined by algorithms that take into account numbers of viewers who watched the video segment, ratings of the video segment, metrics derived from social media, or any other factor that can indicate likelihood that the video segment will be viewed.

In some implementations, a device, computer-program product, and method for improving management of system resources in a matching system is provided. For example, a method can include receiving a reference data set associated with a media segment and storing the reference data set in a reference database. In some examples, the reference data set can be received by a server. The server can be configured to identify an unidentified media segment by matching an unidentified data set with the reference data set. In such examples, the unidentified data set can be associated with the unidentified media segment. In some examples, a reference data set can include pixel data or audio data for a frame of the media segment.

The method can further include receiving popularity data indicating a popularity of the media segment. In some examples, the popularity data includes at least one or more of viewing information of the media segment, rating information of the media segment, or information associated with a posted message on a remote source. In such examples, the posted message can be associated with the media segment. In some examples, the information associated with the posted message on the remote source can include at least one or more of a number of posted messages on the remote source, a number of the posted messages that are positive, a number of the posted messages that are negative, a number of positive indications to the posted messages, a number of reposts of the posted message, or a number of views of the posted messages. In such examples, the posted messages are associated with the media segment. In some examples, the viewing information can include a number of times the media segment has been identified by the server.

The method can further include determining a deletion time for the reference data set. In some examples, the deletion time can be determined using the popularity data. The method can further include deleting the reference data set from the reference database. In some examples, the reference data set can be deleted after the deletion time has expired. In some examples, determining a deletion time can include computing an average of two or more values of the popularity data. In such examples, each value of the popularity data can be associated with a weight.

In some implementations, the method can further include adding the reference data set to a backup database when the reference data set is deleted from the reference database. In such implementations, the server can be configured to search the backup database after the reference database for a data set matching the unidentified data set.

The features, aspects, and advantages of the present disclosure will be most easily understood when the following description is read with reference to the accompanying drawings in which like numerical identifications represent like components or parts throughout the drawings.

BRIEF DESCRIPTION OF THE FIGURES

Illustrative examples are described in detail below with reference to the following figures.

DETAILED DESCRIPTION

Figure 1:
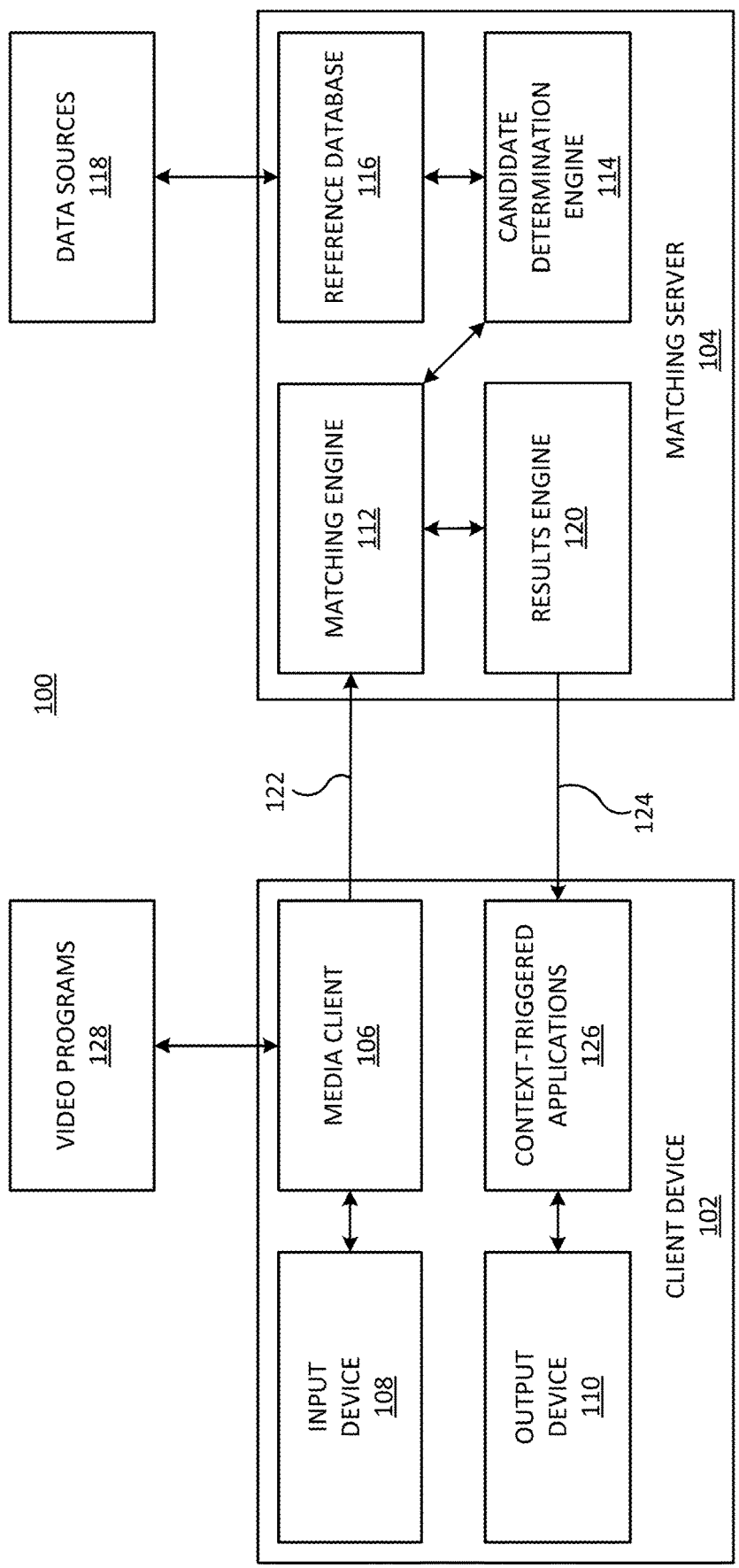
FIG. 1 is a block diagram of an example of a matching system for identifying video content being viewed by a media system.

In the following description, for the purposes of explanation, specific details are set forth in order to provide a thorough understanding of examples of the invention. However, it will be apparent that various examples may be practiced without these specific details. The figures and description are not intended to be restrictive.

The ensuing description provides exemplary examples only, and is not intended to limit the scope, applicability, or configuration of the disclosure. Rather, the ensuing description of the exemplary examples will provide those skilled in the art with an enabling description for implementing an exemplary example. It should be understood that various changes may be made in the function and arrangement of elements without departing from the spirit and scope of the invention as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or other information may be passed, forwarded, or transmitted using any suitable means including memory sharing, message passing, token passing, network transmission, or other transmission technique.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

As described in further detail below, certain aspects and features of the present disclosure relate to identifying unknown video segments by comparing unknown data points to one or more reference data points. The systems and methods described herein improve the efficiency of storing and searching large data sets that are used to identify the unknown video segments. For example, the systems and methods allow identification of the unknown data segments while reducing the density of the large data sets required to perform the identification. The techniques can be applied to any system that harvests and manipulates large volumes of data. Illustrative examples of these systems include automated content-based searching systems (e.g., automated content recognition for video-related applications or other suitable application), MapReduce systems, Bigtable systems, pattern recognition systems, facial recognition systems, classification systems, computer vision systems, data compression systems, cluster analysis, or any other suitable system. One of ordinary skill in the art will appreciate that the techniques described herein can be applied to any other system that stores data that is compared to unknown data. In the context of automated content recognition (ACR), for example, the systems and methods reduce the amount of data that must be stored in order for a matching system to search and find relationships between unknown and known data groups.

By way of example only and without limitation, some examples described herein use an automated audio and/or video content recognition system for illustrative purposes. However, one of ordinary skill in the art will appreciate that the other systems can use the same techniques.

A significant challenge with ACR systems and other systems that use large volumes of data can be managing the amount of data that is required for the system to function. Another challenge includes a need to build and maintain a database of known content to serve as a reference to match incoming content. Building and maintaining such a database involves collecting and digesting a vast amount (e.g., hundreds, thousands, or more) of content (e.g., nationally distributed television programs and an even larger amount of local television broadcasts among many other potential content sources). The digesting can be performed using any available technique that reduces the raw data (e.g., video or audio) into compressed, searchable data. With a 24-hour, seven-day-a-week operating schedule and a sliding window of perhaps two weeks of content (e.g., television programming) to store, the data volume required to perform ACR can build rapidly. Similar challenges can be present with other systems that harvest and manipulate large volumes of data, such as the example systems described above.

The systems and methods described herein can allow improved management of system resources in an ACR system. For example, examples can increase the efficiency of system resource utilization by managing the duration that data related to video segments are retained based on data that takes into account an identified popularity of a video segment. The identified popularity can be determined by algorithms that take into account numbers of viewers who watched the video segment, ratings of the video segment, metrics derived from social media, or any other factor that can indicate likelihood that the video segment will be viewed. While description herein can refer to a video segment, other media segments can also be used, including audio segments.

FIG. 1 illustrates a matching system 100 that can identify unknown content. In some examples, the unknown content can include one or more unknown data points. In such examples, the matching system 100 can match unknown data points with reference data points to identify unknown video segments associated with the unknown data points. The reference data points can be included in a reference database 116.

The matching system 100 includes a client device 102 and a matching server 104. The client device 102 includes a media client 106, an input device 108, an output device 110, and one or more contextual applications 126. The media client 106 (which can include a television system, a computer system, or other electronic device capable of connecting to the Internet) can decode data (e.g., broadcast signals, data packets, or other frame data) associated with video programs 128. The media client 106 can place the decoded contents of each frame of the video into a video frame buffer in preparation for display or for further processing of pixel information of the video frames. The client device 102 can be any electronic decoding system that can receive and decode a video signal. The client device 102 can receive video programs 128 and store video information in a video buffer (not shown). The client device 102 can process the video buffer information and produce unknown data points (which can referred to as "cues"), described in more detail below with respect to FIG. 3. The media client 106 can transmit the unknown data points to the matching server 104 for comparison with reference data points in the reference database 116.

The input device 108 can include any suitable device that allows a request or other information to be input to the media client 106. For example, the input device 108 can include a keyboard, a mouse, a voice-recognition input device, a wireless interface for receiving wireless input from a wireless device (e.g., from a remote controller, a mobile device, or other suitable wireless device), or other suitable input device. The output device 110 can include any suitable device that can present or otherwise output information, such as a display, a wireless interface for transmitting a wireless output to a wireless device (e.g., to a mobile device or other suitable wireless device), a printer, or other suitable output device.

The matching system 100 can begin a process of identifying a video segment by first collecting data samples from known video data sources 118. For example, the matching server 104 collects data to build and maintain a reference database 116 from a variety of video data sources 118. The video data sources 118 can include media providers of television programs, movies, or any other suitable video source. Video data from the video data sources 118 can be provided as over-the-air broadcasts, as cable TV channels, as streaming sources from the Internet, and from any other video data source. In some examples, the matching server 104 can process the received video from the video data sources 118 to generate and collect reference video data points in the reference database 116, as described below. In some examples, video programs from video data sources 118 can be processed by a reference video program ingest system (not shown), which can produce the reference video data points and send them to the reference database 116 for storage. The reference data points can be used as described above to determine information that is then used to analyze unknown data points.

The matching server 104 can store reference video data points for each video program received for a period of time (e.g., a number of days, a number of weeks, a number of months, or any other suitable period of time) in the reference database 116. The matching server 104 can build and continuously or periodically update the reference database 116 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) are collected for each program source. Any number of program sources can be used to obtain video, such as 25 channels, 50 channels, 75 channels, 100 channels, 200 channels, or any other number of program sources. Using the example amount of data, the total data collected during a 24-hour period over three days becomes very large. Therefore, reducing the number of actual reference data point sets is advantageous in reducing the storage load of the matching server 104.

The media client 106 can send a communication 122 to a matching engine 112 of the matching server 104. The communication 122 can include a request for the matching engine 112 to identify unknown content. For example, the unknown content can include one or more unknown data points and the reference database 116 can include a plurality of reference data points. The matching engine 112 can identify the unknown content by matching the unknown data points to reference data in the reference database 116. In some examples, the unknown content can include unknown video data being presented by a display (for video-based ACR), a search query (for a MapReduce system, a Bigtable system, or other data storage system), an unknown image of a face (for facial recognition), an unknown image of a pattern (for pattern recognition), or any other unknown data that can be matched against a database of reference data. The reference data points can be derived from data received from the video data sources 118. For example, data points can be extracted from the information provided from the video data sources 118 and can be indexed and stored in the reference database 116.

The matching engine 112 can send a request to the candidate determination engine 114 to determine candidate data points from the reference database 116. A candidate data point can be a reference data point that is a certain determined distance from the unknown data point. In some examples, a distance between a reference data point and an unknown data point can be determined by comparing one or more pixels (e.g., a single pixel, a value representing group of pixels (e.g., a mean, an average, a median, or other value), or other suitable number of pixels) of the reference data point with one or more pixels of the unknown data point. In some examples, a reference data point can be the certain determined distance from an unknown data point when the pixels at each sample location are within a particular pixel value range.

In one illustrative example, a pixel value of a pixel can include a red value, a green value, and a blue value (in a red-green-blue (RGB) color space). In such an example, a first pixel (or value representing a first group of pixels) can be compared to a second pixel (or value representing a second group of pixels) by comparing the corresponding red values, green values, and blue values respectively, and ensuring that the values are within a certain value range (e.g., within 0-5 values). For example, the first pixel can be matched with the second pixel when (1) a red value of the first pixel is within 5 values in a 0-255 value range (plus or minus) of a red value of the second pixel, (2) a green value of the first pixel is within 5 values in a 0-255 value range (plus or minus) of a green value of the second pixel, and (3) a blue value of the first pixel is within 5 values in a 0-255 value range (plus or minus) of a blue value of the second pixel. In such an example, a candidate data point is a reference data point that is an approximate match to the unknown data point, leading to multiple candidate data points (related to different media segments) being identified for the unknown data point. The candidate determination engine 114 can return the candidate data points to the matching engine 112.

For a candidate data point, the matching engine 112 can add a token into a bin that is associated with the candidate data point and that is assigned to an identified video segment from which the candidate data point is derived. A corresponding token can be added to all bins that correspond to identified candidate data points. As more unknown data points (corresponding to the unknown content being viewed) are received by the matching server 104 from the client device 102, a similar candidate data point determination process can be performed, and tokens can be added to the bins corresponding to identified candidate data points. Only one of the bins corresponds to the segment of the unknown video content being viewed, with the other bins corresponding to candidate data points that are matched due to similar data point values (e.g., having similar pixel color values), but that do not correspond to the actual segment being viewed. The bin for the unknown video content segment being viewed will have more tokens assigned to it than other bins for segments that are not being watched. For example, as more unknown data points are received, a larger number of reference data points that correspond to the bin are identified as candidate data points, leading to more tokens being added to the bin. Once a bin includes a particular number of tokens, the matching engine 112 can determine that the video segment associated with the bin is currently being displayed on the client device 102. A video segment can include an entire video program or a portion of the video program. For example, a video segment can be a video program, a scene of a video program, one or more frames of a video program, or any other portion of a video program.

Figure 2:
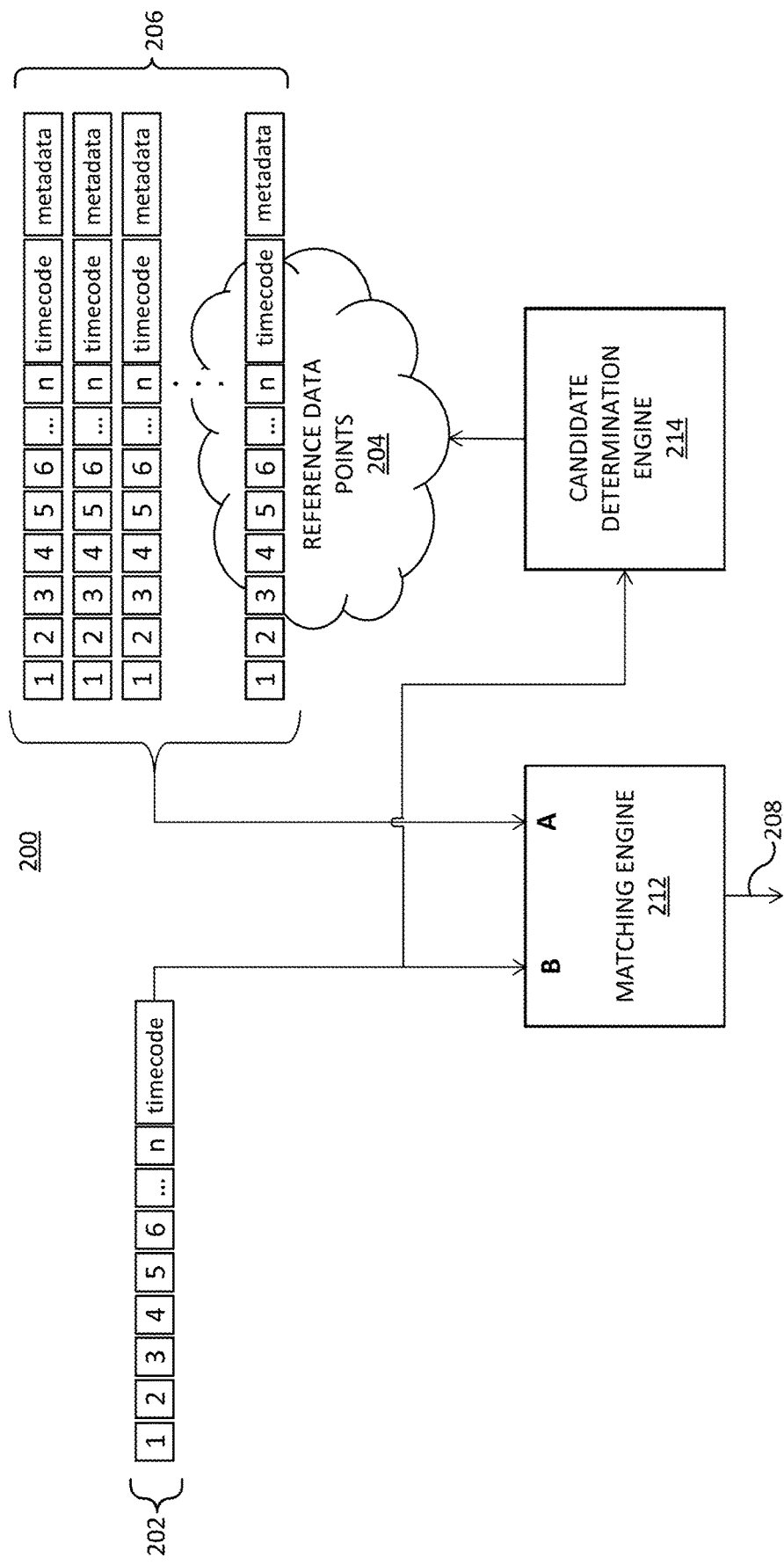
FIG. 2 illustrates an example of a matching system identifying unknown data points.

FIG. 2 illustrates components of a matching system 200 for identifying unknown data. For example, the matching engine 212 can perform a matching process for identifying unknown content (e.g., unknown media segments, a search query, an image of a face or a pattern, or the like) using a database of known content (e.g., known media segments, information stored in a database for searching against, known faces or patterns, or the like). For example, the matching engine 212 receives unknown data content 202 (which can be referred to as a "cue") to be matched with a reference data point of the reference data points 204 in a reference database. The unknown data content 202 can also be received by the candidate determination engine 214, or sent to the candidate determination engine 214 from the matching engine 212. The candidate determination engine 214 can conduct a search process to identify candidate data points 206 by searching the reference data points 204 in the reference database. In one example, the search process can include a nearest neighbor search process to produce a set of neighboring values (that are a certain distance from the unknown values of the unknown data content 202). The candidate data points 206 are input to the matching engine 212 for conducting the matching process to generate a matching result 208. Depending on the application, the matching result 208 can include video data being presented by a display, a search result, a determined face using facial recognition, a determined pattern using pattern recognition, or any other result.

In determining candidate data points 206 for an unknown data point (e.g., unknown data content 202), the candidate determination engine 214 determines a distance between the unknown data point and the reference data points 204 in the reference database. The reference data points that are a certain distance from the unknown data point are identified as the candidate data points 206. In some examples, a distance between a reference data point and an unknown data point can be determined by comparing one or more pixels of the reference data point with one or more pixels of the unknown data point, as described above with respect to FIG. 1. In some examples, a reference data point can be the certain distance from an unknown data point when the pixels at each sample location are within a particular value range. As described above, a candidate data point is a reference data point that is an approximate match to the unknown data point, and because of the approximate matching, multiple candidate data points (related to different media segments) are identified for the unknown data point. The candidate determination engine 114 can return the candidate data points to the matching engine 112.

Figure 3:
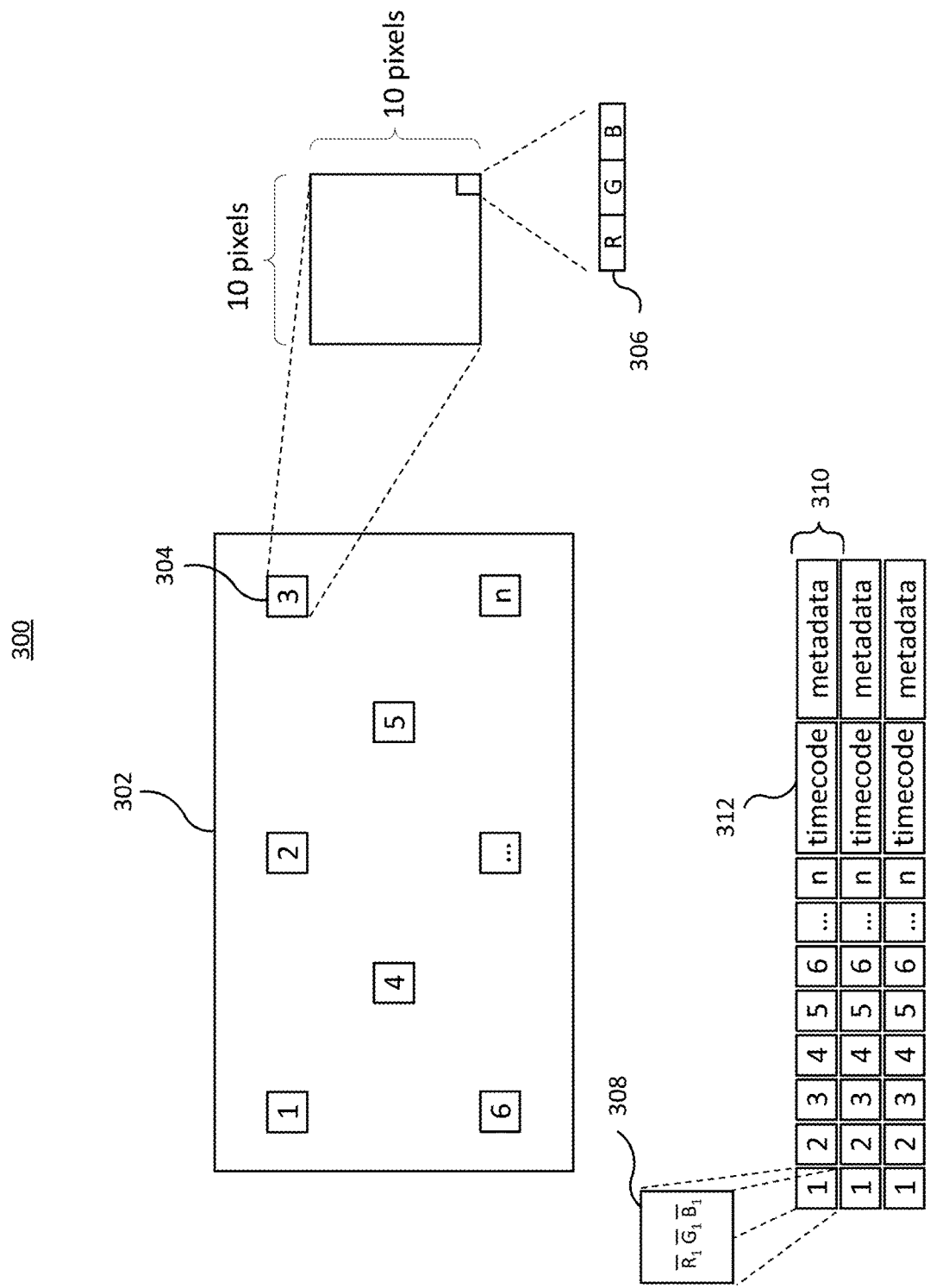
FIG. 3 is a block diagram of an example of a video capture system.

FIG. 3 illustrates an example of a video ingest capture system 400 including a memory buffer 302 of a decoder. The decoder can be part of the matching server 104 or the media client 106. The decoder may not operate with or require a physical television display panel or device. The decoder can decode and, when required, decrypt a digital video program into an uncompressed bitmap representation of a television program. For purposes of building a reference database of reference video data (e.g., reference database 316), the matching server 104 can acquire one or more arrays of video pixels, which are read from the video frame buffer. An array of video pixels is referred to as a video patch. A video patch can be any arbitrary shape or pattern but, for the purposes of this specific example, is described as a 10×10 pixel array, including ten pixels horizontally by ten pixels vertically. Also for the purpose of this example, it is assumed that there are 25 pixel-patch positions extracted from within the video frame buffer that are evenly distributed within the boundaries of the buffer.

An example allocation of pixel patches (e.g., pixel patch 304) is shown in FIG. 3. As noted above, a pixel patch can include an array of pixels, such as a 10×10 array. For example, the pixel patch 304 includes a 10×10 array of pixels. A pixel can include color values, such as a red, a green, and a blue value. For example, a pixel 306 is shown having Red-Green-Blue (RGB) color values. The color values for a pixel can be represented by an eight-bit binary value for each color. Other suitable color values that can be used to represent colors of a pixel include luma and chroma (Y, Cb, Cr) values or any other suitable color values.

A mean value (or an average value in some cases) of each pixel patch is taken, and a resulting data record is created and tagged with a time code (or time stamp). For example, a mean value is found for each 10×10 pixel patch array, in which case twenty-four bits of data per twenty-five display buffer locations are produced for a total of 600 bits of pixel information per frame. In one example, a mean of the pixel patch 304 is calculated, and is shown by pixel patch mean 308. In one illustrative example, the time code can include an "epoch time," which representing the total elapsed time (in fractions of a second) since midnight, Jan. 1, 1970. For example, the pixel patch mean 308 values are assembled with a time code 412. Epoch time is an accepted convention in computing systems, including, for example, Unix-based systems. Information about the video program, known as metadata, is appended to the data record. The metadata can include any information about a program, such as a program identifier, a program time, a program length, or any other information. The data record including the mean value of a pixel patch, the time code, and metadata, forms a "data point" (also referred to as a "cue"). The data point 310 is one example of a reference video data point.

Figure 4:
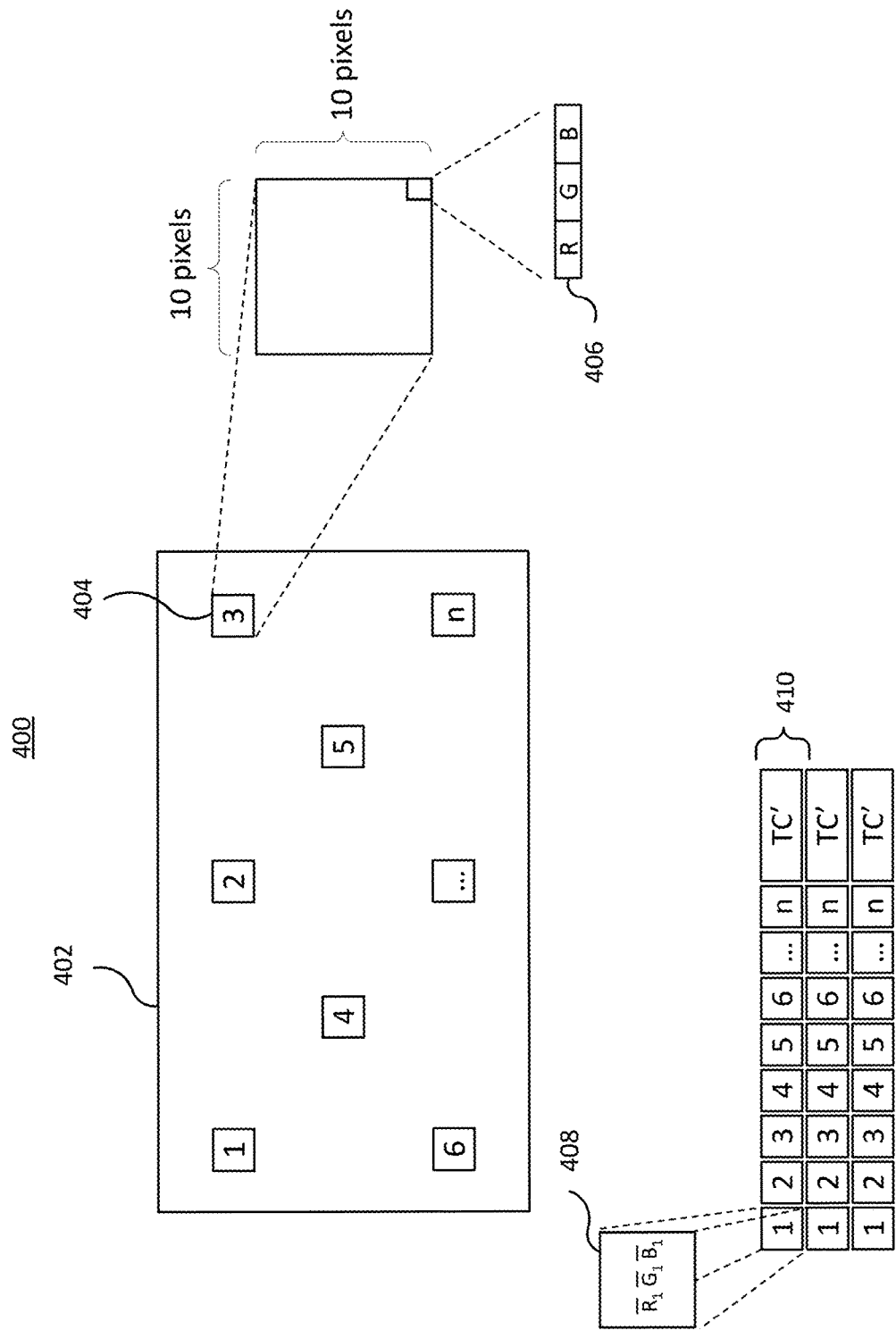
FIG. 4 is a block diagram of an example of a system for collecting video content presented by a display.

A process of identifying unknown video segments begins with steps similar to creating the reference database. For example, FIG. 4 illustrates a video ingest capture system 400 including a memory buffer 402 of a decoder. The video ingest capture system 400 can be part of the client device 102 that processes data presented by a display (e.g., on an Internet-connected television monitor, such as a smart TV, a mobile device, or other television viewing device). The video ingest capture system 400 can utilize a similar process to generate unknown video data point 410 as that used by system 300 for creating reference video data point 310. In one example, the media client 106 can transmit the unknown video data point 410 to the matching engine 112 to identify a video segment associated with the unknown video data point 410 by the matching server 104.

As shown in FIG. 4, a video patch 404 can include a 10×10 array of pixels. The video patch 404 can be extracted from a video frame being presented by a display. A plurality of such pixel patches can be extracted from the video frame. In one illustrative example, if twenty-five such pixel patches are extracted from the video frame, the result will be a point representing a position in a 75-dimension space. A mean (or average) value can be computed for each color value of the array (e.g., RGB color value, Y, Cr, Cb color values, or the like). A data record (e.g., unknown video data point 410) is formed from the mean pixel values and the current time is appended to the data. One or more unknown video data points can be sent to the matching server 104 to be matched with data from the reference database 116 using the techniques described above.

Figure 5:
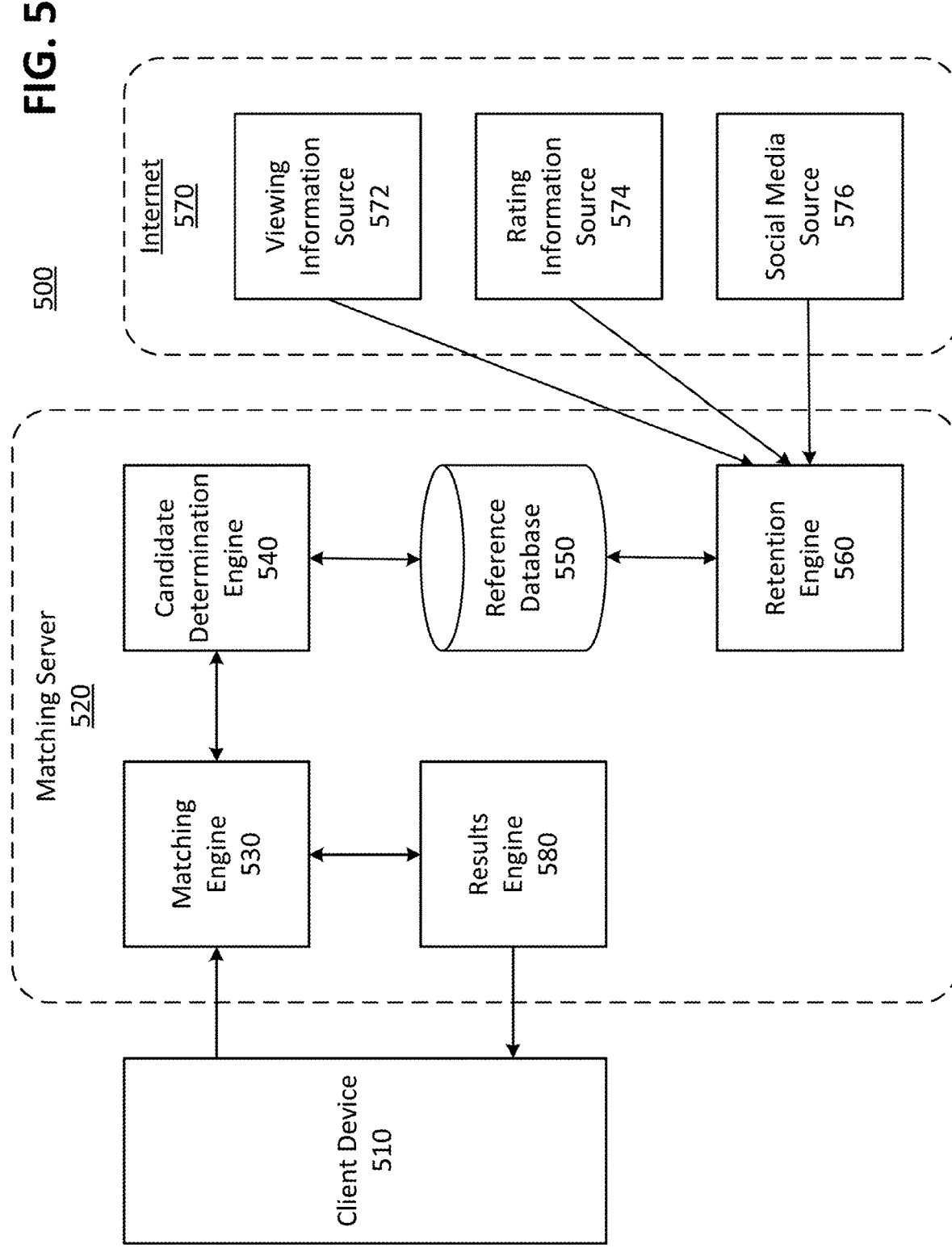
FIG. 5 illustrates an example of a matching system for optimizing resource utilization.

FIG. 5 illustrates an example of a matching system 500 for optimizing resource utilization. The matching system 500 can be similar to the matching system 100 described in FIG. 1. For example, the matching system 500 can include a client device 510 (which can be the same or similar to the client device 102). The client device 510 can receive frames of a video segment from a remote source. In some examples, the frames can be in the form of a broadcast signal. In other examples, the frames can be in the form of data (e.g., frame data) sent to the client device 510 in packets using a network (e.g., the Internet). In some examples, a frame can include pixel values that are used by the client device 510 to present the frame to a user on a display.

In some examples, the pixel values can be sent directly to a matching server 520 (which can perform similar to the matching server 104) from the client device 510. In other examples, a portion of the pixel values can be sent to the matching server 520 using techniques described above (e.g., pixel cue points can be sent to the matching server 520). In other examples, the pixel values (or a portion thereof) can be summarized by the client device 510, where the summarized pixel values can be sent to the matching server 520.

The matching server 520 can include a matching engine 530 (which can perform the same or similar to the matching engine 112) to identify an unidentified video segment being displayed on the client device 510. To identify the unidentified video segment, the matching engine 530 can receive pixel values (or pixel cue points, average pixel values, or other representations of a frame) associated with one or more frames from the client device 510. The matching engine 530 can also receive or obtain reference data to match with the pixel values. In some examples, the reference data can be received from a reference database 550. In such examples, the reference database 550 can send one or more reference data sets, which can be stored in the reference database 550, to the matching engine 530. In other examples, the matching engine 530 can obtain the one or more reference data sets from the reference database 550 using a database query. In some examples, the matching engine 530 can send a request to a candidate determination engine 540 to determine candidate data points from the reference database 550. As described above, the candidate data points can be reference data points that are a certain determined distance from one or more data points in a frame. The candidate determination engine 540 can return the candidate data points to the matching engine 530.

As described above, for each of the candidate data points, the matching engine 530 can add a token into a bin corresponding to an identified video segment. The identified video segment can be associated with one or more candidate data points that include the candidate data point causing the token to be added to the bin. This process can repeat for each new frame that is sent to the matching engine 530 from the client device 510. Once a bin includes a particular number of tokens, the matching engine 530 can determine that the video segment associated with the bin is currently being displayed by the client device 510.

Once the matching engine 530 identifies a video segment, the matching engine 530 can send a signal to a results engine 580 (which can perform similar to the results engine 120) indicating the identified video segment. The results engine 580 can determine an action to perform in response to the identified video segment. In some examples, the results engine 580 can identify a contextual application that corresponds to the identified video segment. The contextual application can be stored on the client device 510. In some examples, the contextual application can be an application associated with at least a portion of a video segment. The contextual application can run on the client device 510 to display content on the client device 510. The content displayed can be an overlay on content already being displayed on the client device 510 or can replace the content being displayed on the client device 510.

The results engine 580 can send a signal to the client device 510 to cause the identified contextual application to perform an action. For example, the contextual application can display content on the client device 510. The content can be related to the identified video segment. Other actions the identified contextual application can perform include, but are not limited to, replacement of a commercial message with one more commercial messages directed to a specific viewer, additional information regarding the identified video segment, or an opportunity to interact with the identified video segment or other's watching the identified video segment.

In some examples, the reference data sets in the reference database 550 can be managed by a retention engine 560. Management of the reference data sets can include determining when to remove, or delete, reference data sets from the reference database 550. In some examples, when a reference data set that is associated with a video segment is removed, one or more other reference data sets that are also associated with the video segment can be removed. In some examples, the one or more other reference data sets are not removed. Further details regarding removal or deletion of reference data sets are described below.

In some examples, reference data sets that are removed, or deleted, from the reference database 550 can be added to a backup database (not shown). In some examples, the backup database can be located on the matching server 520. In other examples, the backup database can be located remotely from the matching server 520. In such examples, the backup database can be on a cloud (e.g., one or more remote servers associated with the matching server 520). The candidate determination engine 540 can be configured to search the backup database for a matching candidate data set after the reference database 550 has been searched and no match is found or an insufficient number of matches has been found.

A person of ordinary skill will recognize that there might be more than one backup database. Zero or more of the backup databases can be located with the matching server 520 and zero or more the backup databases can be located remotely from the matching server 520. In some examples, each additional backup database can retain reference data sets longer than a previous backup database. When a reference data set is removed completely from databases associated with the matching server 520, the reference data set would no longer be able to be compared to a unidentified data set by the candidate determination engine 540. In some examples, each backup database can be managed by the retention engine 560. In other examples, each backup database can be managed by a separate retention engine. A backup database can either use the same length of time as the reference database (essentially doubling the life of a reference data set) or can use a different length of time based on a same, a similar, or a different process as that used to determine the length of time for the reference database.

A person of ordinary skill in the art will recognize that a number of backup databases used will depend on resources available for an enterprise managing the backup databases, as well as efficiency concerns with having the candidate determining engine searching more and more backup databases. In some examples, each backup database can be searched using a separate process, allowing searches of multiple backup databases to minimally affect normal operation of the candidate determination engine 540. In some examples, the separate processes can be run in parallel so that that multiple backup databases can be searched at least partially in parallel. For example, a first database can be searched until a certain percent of the first database has been searched, at which time a second database can begin being searched in parallel with the first database.

The retention engine 560 can determine a length of time to retain reference data sets in the reference database 550 (e.g., referred to as a deletion time, a retention time, a removal time, or any other term that indicates a time at which a reference data set is removed, or deleted, from the reference database 550). The retention engine 560 can use popularity data (e.g., statistics, numbers, information, or other popularity data) associated with a video segment to determine the length of time to retain a reference data set.

In some examples, the length of time can be different for reference data sets associated with different video segments, for each reference data set, or any combination thereof. A person of ordinary skill in the art will recognize that many configurations of length of time for reference data sets can apply.

In some examples, the length of time can be extended whenever a particular number of views of a video segment occur with the matching server 520 (e.g., 1 view per day, 10 views per day, 1 view per week, an average of 10 views per week, or any other suitable number of views). The views of the video segment can be determined when the matching server 520 identifies that a media system is displaying the video segment, as will be discussed below. In some examples the length of time can be reassessed when the length of time expires.

In some examples, the length of time can be consistent for all video segments of a content item (e.g., a movie, a show, an episode, etc.). For example, all reference data sets for all video segments of a content item can be retained for a day, a week, or another amount of time. In some examples, the length of time can be consistent for all reference data sets associated with a single video segment. In such examples, even though a reference data set is not matched by the matching server 520, the reference data set can be retained as long as another reference data set associated with the same video segment is matched by the matching server 520.

In some examples, the popularity data can be associated with an identified popularity of a video segment. The popularity data can include viewing information, which can indicate a number of views of a video segment from a viewing information source 572. In some examples, the number of views can be associated with a particular time period. In some examples, the time period can be the day that a video segment is broadcast (e.g., same-day viewing data) or a period of time later after the day that a video segment is broadcast (delayed viewing data). A person of ordinary skill in the art will recognize that other time periods can be used.

In some examples, the viewing information source 572 can be a third-party server (e.g., over a network, such as using the Internet 570). Examples of viewing information can include any type of audience measurement system, including, but not limited to, Nielsen/NetRatings, Nielsen BuzzMetrics, Nielsen Media Research (NMR) comScore, Wakoopa, and Hitwise, Visible Measures, GfK, Sightcorp, TruMedia, Quividi, relEYEble, stickyPiXEL, Cognitec, goCount and CognoVision, or any other form of audience measurement system.

In some examples, the viewing information can be determined using the matching engine 530. For example, when a video segment is identified by the matching engine 530 (when a bin reaches a certain number of tokens, as described above), the matching server 520 can store a record that the video segment has been displayed by a media system. In such an example, the matching server 520 can keep track of the number of times a video segment has been displayed by a media system. Thus, the number of times a video segment has been displayed by a media system can be used as a number of viewings of a video segment for purposes of the viewing information.

A person of ordinary skill in the art will also recognize that more than one viewing information can be used to determine the length of time. For example, viewing information using the matching engine 530 and viewing information from a viewing information source 572 can be used. For another example, viewing information from a first viewing information source and viewing information from a second viewing information source can be used.

The popularity data can also include rating information of the video segment from a rating source 574. The rating information can indicate a desirability, popularity, and/or demand of the video segment. For example, the rating information can be a percentage of viewers who liked the video segment. The percentage of viewers who liked the video segment can be determined by a source on a network (such as the Internet 570) that provides a rating for video segments. For example, the rating can be a rating given to the video segment by one or more reviewers on a website, a mobile application, or the like. In some examples, the one or more reviewers can be from at least one or more of a professional group of reviewers and a recreational group of reviewers. The rating sources 574 can be a third-party server (e.g., over a network, such as using the Internet 570). Examples of the rating source 574 can include Rotten Tomatoes, Metacritic, Everyone's a Critic, Reviewer, Movie Attractions, Flixster, FilmCrave, Flickchart, blogs, and systems such as the "undulating curve of shifting expectations" (which use automated systems to review video segments). A person of ordinary skill in the art will also recognize that more than one rating information or source can be used to determine the length of time. In one illustrative example, rating information using a professional reviewer and rating information from a recreational group of reviewers can be used.

The popularity data can also include information associated with one or more posts (e.g., a posted message) on one or more remote sources (e.g., a review source or a social media source 576, such as a website and a mobile application). The one or more posts can be associated with the video segment. The social media source 576 can be a third-party server (e.g., over a network, such as using the Internet 570). Examples of a social media source can include, but are not limited to, Facebook, YouTube, Twitter, LinkedIn, Pinterest, Google Plus+, Instagram, Reddit, and Rotten Tomatoes.

Examples of information associated with one or more posts can include, but are not limited to, at least one or more of a number of posted messages from one or more remote sources, a number of posted messages from one or more remote sources that are positive in nature toward the video segment (based on a natural language parsing of the one or more message), a number of posted messages from one or more remote sources that are negative in nature toward the video segment (again, based on a natural language parsing of the one or more message), a number of positive indications from one or more remote sources (e.g., a "Like" on Facebook), a number of reposts of a posted message associated with a video segment on one or more remote sources, a number of views of a page associated with the video segment on one or more remote sources, or any combination thereof. In some examples, a rating (e.g., 1 to 100) can be determined from one or more posted messages that identifies how much the video segment is liked based on words used in the one or more posted messages. In such examples, certain words can score certain points. In some examples, a number of mentions on a social media platform regarding a video segment or an actor associated with the video program.

A person of ordinary skill in the art will also recognize that more than one information associated with one or more posts on one or more remote sources information can be used to determine the length of time. For example, information of a number of posted messages from one or more remote sources and a number of positive indications from the one or more remote sources can be used.

In some examples, the length of time can be determined by calculating a representative value (e.g., an average, a mean, a median, or some combination thereof) of the popularity data. The representative value can indicate a probability of whether a reference data set will be (or is sufficiently likely to be) needed by the matching system in the future to justify a cost of retaining the reference data set in the reference database 550. In some examples, an average can indicate a likelihood that a video segment will be displayed on a media system (either associated with the matching server or not) within a particular amount of time (e.g., within a day, within a week, within a month, or with any other suitable period of time). When calculating the average, the retention engine 560 can identify the popularity data available, and use the available popularity data. While calculating an average, if a video segment is not included in a source, a reference data set associated with the video segment can receive a zero for the source.

In some examples, the popularity data can be normalized such that the popularity data is all based on a similar or a same scale. For example, a rating from 0 to 1 can be multiplied by 100 to correspond to a rating from 0 to 100. For another example, a largest number for each type of popularity data can either be determined by analyzing a type of popularity data or pre-identified by a user. In such an example, a number associated with a type of popularity data can be divided by the largest number such that all of the numbers are a percentage of the largest number. In some examples, numbers larger than the largest number can either be allowed to pass a percentage of 1, or the number can be capped at 1.

Figure 6:
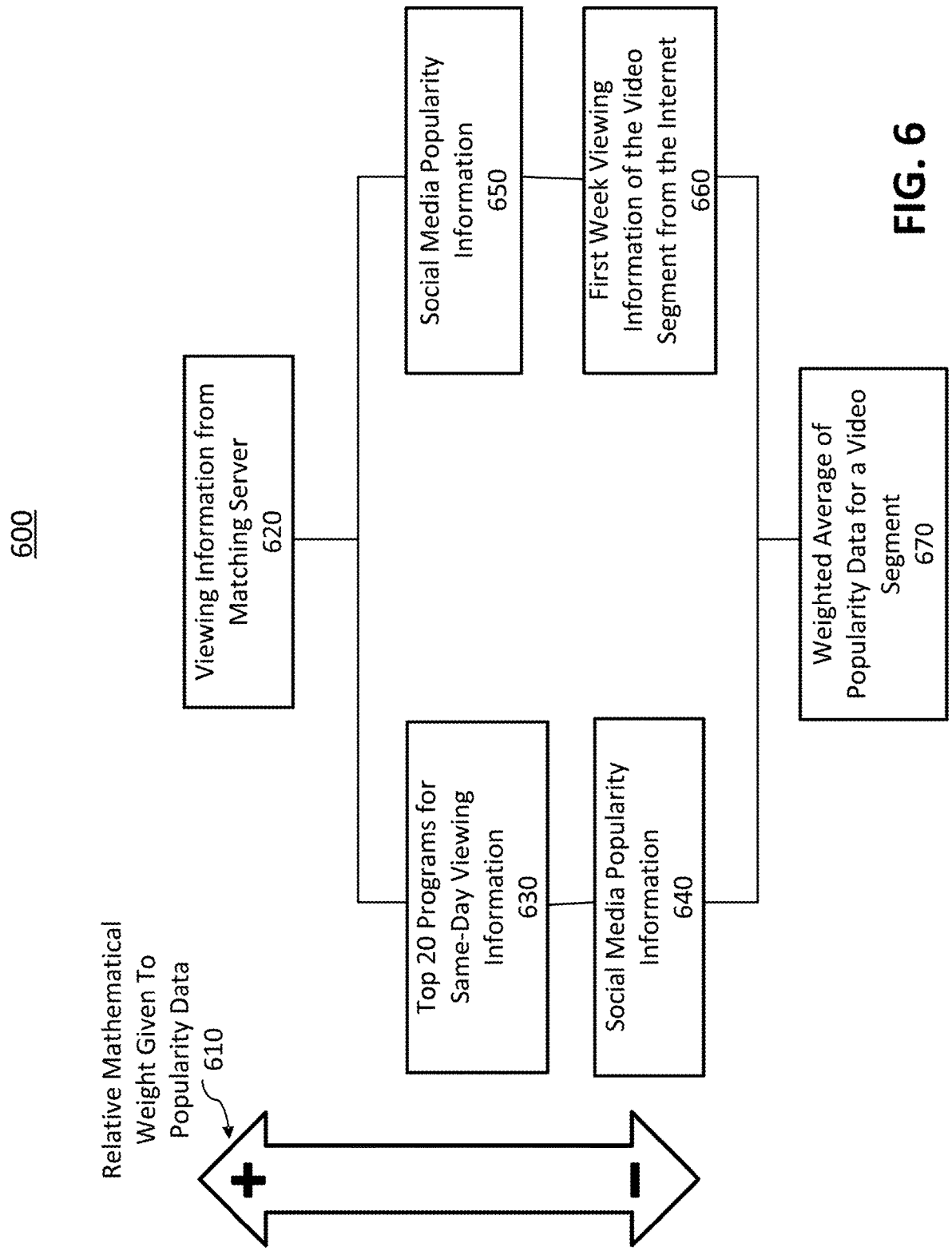
FIG. 6 is a diagram illustrating an example of relative weights for data used to determine whether to retain a reference data set.

In some examples, weights can be applied to the popularity data, such that some portions of the popularity data affect the average more than others. In an illustrative example, weighting of popularity data can include: direct mention of a video segment or actor associated with the video segment could be weighted higher than a mention of the video segment on a social media communication. Another weighting factor could be a number of words used in a message associated with a video segment. Another weighting factor could be a number of specific actors associated with a video segment cited in a message. FIG. 6 is a diagram illustrating an example of relative weights for popularity data used to determine whether to retain a reference data set. A person of ordinary skill in the art will recognize that a weight can be within a range, such as a range from 0 to 100, a range from 0 to 1, or other suitable range of weight values. The sum of all of the weights can equal to 100, to 1, or other value at the top of a range. The weights can be multiplied by portions of the popularity data to either enhance the popularity data or reduce the popularity data. Other methods of weighting data can also be used. While FIG. 6 illustrates a particular order of relative weights, a person of ordinary skill in the art will recognize that a different order can be used and different popularity data can be used.

In one example, a highest weight (e.g., 50%) can be associated with one or more popularity datum of the popularity data. A popularity datum can be a viewing information from the matching server (block 620). The viewing information can indicate a number of times a video segment is identified by the matching server as having been viewed by a media system associated with the matching system. The number can increase every time that the matching server identifies the video segment as being displayed by a media system, as described above.

In the same example, a medium weight (e.g., 30%) can be associated with one or more popularity datum of the popularity data. For example, a first popularity datum of the popularity data can be a list of the top 20 programs for same-day viewing information (block 630). The list can include a number of times a top 20 program is viewed. The same-day viewing information can be received from a secondary source (e.g., from a viewing information source 572 over the Internet). The same-day viewing information can be weighted less than the viewing information from the matching server (block 620) because the same-day viewing information is not from the matching server, but from a secondary source. A second popularity datum of the popularity data can be social media popularity information (block 650). The social media popularity information can be a number of posted messages regarding the video segment on one or more social media sources. For example, a wall post on Facebook can mention a video segment by name. The wall post can count as one posted message regarding the video segment.

In the same example, a low weight (e.g., 20%) can also be associated with one or more popularity datum of the popularity data. For example, a first popularity datum of the popularity data can be a second social media popularity information (block 640). The second social media popularity information can be a number of positive indications from one or more social media sources. A second popularity data of the popularity data can be a number of positive indications from the one or more remote sources (block 660). A person of ordinary skill will recognize that other configurations of weight can be used. In addition, any combination of popularity data can be used for a calculation of the weights.

The weights can be applied to the popularity data or the averages of the popularity data to create a weighted average of popularity data for a video segment (block 670). For example, weights can be applied by multiplication with an average data associated with a weight.

A total number (e.g., an average, a weighted average, or a sum of the popularity data data) associated with a video segment can be used to determine a length of time to retain one or more reference data sets associated with the video segment. In some examples, the length of time can be computed using a range for the total number. In some examples, a range can be predetermined (e.g., 0 to 50 or some other range that is received by the retention engine), based on particular percentages of the maximum total number possible, based on total numbers that have been seen by the matching system, or some other method of determining a range. In one illustrative example of percentages of the maximum total number possible, a maximum number for each popularity datum used to compute the total number can be summed together to determine the maximum total number possible. Then, each range can represent a certain percentage of the maximum total number possible. For example, a first range can be all total numbers that fall between 0 and 50% of the maximum total number possible.

In one illustrative example, when the total number is within a first range, a reference data set associated with the video segment associated with the total number can be retained for a first period of time (e.g., a day). When the total number is within a second range, the reference data set associated with the video segment associated with the total number can be retained for a second period of time (e.g., one week). A person of ordinary skill in the art will recognize that the ranges, the periods of time, and the number of ranges can be different than illustrated above.

The process of determining lengths of time can be dynamically configured by the retention engine 560. For example, the ranges can be manipulated during normal processing to see whether different ranges provide an effective balance between number of matches and size of the reference database. Effectiveness of the length of time determination can be based on a number of matches determined and an average time between matches in the reference database (where the average time is a positive whole number such as nanoseconds). For example, an efficiency measure can be calculated by dividing the number of matches determined by the average time. The efficiency measure can be optimized by changing the ranges, the periods of times, and the number of ranges by small increments until an optimized efficiency measure is found. The small increments can be tested by rematching past popularity data with different retention policies (e.g., various configurations of ranges, periods of time, and number of ranges) to see if the efficiency measure increases or decreases.

In some examples, a length of time can be determined based on viewing statistics that measured an average number of days that a video segment was viewed. Such data can be commercially available from companies such as AC Nielsen and Rentrack. The data can then be correlated with the popularity data (perhaps weighted by genre, e.g., sports, reality TV, crime series, etc.). The correlated data can then provide a direct time metric relative to popularity.

In other examples, a length of time can be determined based on tracking value of a weighted average. For example, when said an average value falls below a predetermined limit (e.g., below 50%), the video segment data can cease to be retained for a predetermined period of time.

Figure 7:
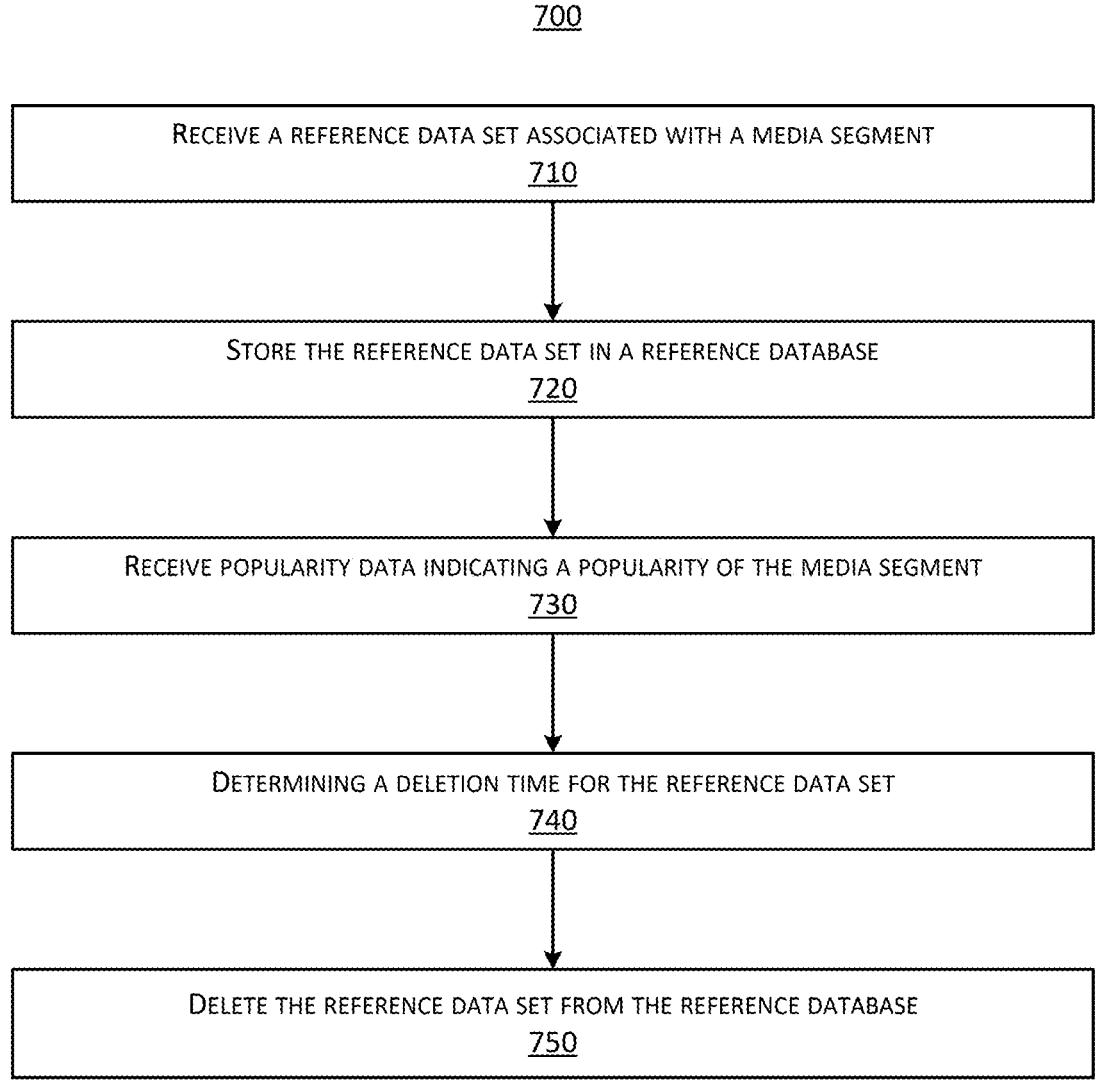
FIG. 7 is a flowchart illustrating an example of a process for optimizing resource utilization in a matching system.

FIG. 7 is a flowchart illustrating an example of a process 700 for optimizing resource utilization in a matching system. Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 710, the process 700 includes receiving a reference data set associated with a media segment. In some examples, the reference data set can be received by a server. The server can be configured to identify an unidentified media segment by matching an unidentified data set with the reference data set. In some examples, the unidentified data set can be associated with the unidentified media segment. In some examples, the reference data set can include pixel data or audio data for a frame of the media segment.

At step 720, the process 700 includes storing the reference data set in a reference database.

At step 730, the process 700 includes receiving popularity data indicating a popularity of the media segment. In some examples, the popularity data includes at least one or more of viewing information of the media segment, rating information of the media segment, or information associated with a posted message on a remote source. In such examples, the posted message can be associated with the media segment. In some examples, the information associated with the posted message on the remote source can include at least one or more of a number of posted messages on the remote source, a number of the posted messages that are positive, a number of the posted messages that are negative, a number of positive indications to the posted message, a number of reposts of the posted message, or a number of views of the posted message. In some examples, the posted messages can be associated with the media segment. In some examples, the viewing information can include a number of times the media segment has been identified by the server.

At step 740, the process 700 includes determining a deletion time for the reference data set. In some examples, the deletion time can be determined using the popularity data. In some examples, determining a deletion time can include computing an average of two or more values of the popularity data. In such examples, each value of the popularity data can be associated with a weight.

At step 750, the process 700 includes deleting the reference data set from the reference database. In some examples, the reference data set can be deleted after the deletion time has expired.

In some implementations, the process 700 can further include adding the reference set to a backup database when the reference data set is deleted from the reference database. In such implementations, the server can be configured to search the backup database after the reference database for a data set matching the unidentified data set.

As discussed above, a video matching system can be configured to identify a media content stream when the media content stream includes an unscheduled media segment. As further discussed above, identifying the media content stream may include identifying media content played by a media display device before or after the unscheduled media segment. Processes for identifying media content are discussed above with respect to FIG. 1. Specifically, the video content system may use samples taken from the display mechanism of the media content device (e.g., graphic and/or audio samples) and generate cues from these samples. The video matching system may then match the cues against a reference database, where the database contains cues of known content.

The video matching system may further include various methods to improve the efficiency of finding potential matches, or "candidates" in the database. The database may contain an enormous number of cues, and thus the video matching system may include algorithms for finding candidate cues to match against cues generated from the media content device's display mechanism. Locating candidate cues may be more efficient than other methods for matching cue values against the values in the database, such as matching a cue against every entry in the database.

Nearest neighbor and path pursuit are examples of techniques that can be used to locate candidate queues in the reference database. Below, an example of tracking video transmission using ambiguous cues is given, but the general concept can be applied to any field where match candidates are to be selected from a reference database.

A method for efficient video pursuit is presented. Given a large number of video segments, the system must be able to identify in real time what segment a given query video input is taken from and in what time offset. The segment and offset together are referred to as the location. The method is called video pursuit since it must be able to efficiently detect and adapt to pausing, fast forwarding, rewinding, abrupt switching to other segments and switching to unknown segments. Before being able to pursue live video the database is processed. Visual cues (a handful of pixel values) are taken from frames every constant fraction of a second and put in specialized data structure (note that this can also be done in real time). The video pursuit is performed by continuously receiving cues from the input video and updating a set of beliefs or estimates about its current location. Each cue either agrees or disagrees with the estimates, and they are adjusted to reflect the new evidence. A video location is assumed to be the correct one if the confidence in this being true is high enough. By tracking only a small set of possible "suspect" locations, this can be done efficiently.

A method is described for video pursuit but uses mathematical constructs to explain and investigate it. It is the aim of this introduction to give the reader the necessary tools to translate between the two domains. A video signal, or video data, is comprised of sequential frames. Each can be thought of as a still image. Every frame is a raster of pixels. Each pixel is made out of three intensity values corresponding to the red, green, and blue (RGB) make of that pixel's color. In the terminology used herein, a cue is a list of RGB values of a subset of the pixels in a frame and a corresponding time stamp. The number of pixels in a cue is significantly smaller than in a frame, usually between 5 and 15. Being an ordered list of scalar values, the cue values are in fact a vector. This vector is also referred to as a point.

Although these points are in high dimension, usually between 15 and 150, they can be imagined as points in two dimensions. In fact, the illustrations will be given as two dimensional plots. Now, consider the progression of a video and its corresponding cue points. Usually a small change in time produces a small change in pixel values. The pixel point can be viewed as "moving" a little between frames. Following these tiny movements from frame to frame, the cue follows a path in space like a bead would on a bent wire.

In the language of this analogy, in video pursuit the locations of the bead in space (the cue points) are received and the part of wire (path) the bead is following is looked for. This is made significantly harder by two facts. First, the bead does not follow the wire exactly but rather keeps some varying unknown distance from it. Second, the wires are all tangled together. These statements are made exact in section 2. The algorithm described below does this in two conceptual steps. When a cue is received, the algorithm looks for all points on all the known paths that are sufficiently close to the cue point; these are called suspects. This is done efficiently using the Probabilistic Point Location in Equal Balls algorithm. These suspects are added to a history data structure and the probability of each of them indicating the true location is calculated. This step also includes removing suspect locations that are sufficiently unlikely. This history update process ensures that on the one hand only a small history is kept but on the other hand no probable locations are ever deleted. The generic algorithm is given in Algorithm 1 and illustrated in FIG. 8.

| Algorithm 1 Generic path pursuit algorithm. |
| --- |
| 1: Set of suspects is empty |
| 2: loop |
| 3:     Receive latest cue. |
| 4:     Find path points who are close to it. |
| 5:     Add them to the set of suspects. |
| 6:     Based on the suspects update the location likelihood function. |
| 7:     Remove from suspect set those who do not contribute to the likelihood function. |
| 8:     if A location is significantly likely then |
| 9:         Output the likely location. |
| 10:     end if |
| 11: end loop |

The following sections begin with describing the Probabilistic Point Location in Equal Balls (PPLEB) algorithm in Section 1. The PPLEB algorithm is used in order to perform line 5 in Algorithm 1 above efficiently. The ability to perform this search for suspects quickly is crucial for the applicability of this method. In section 2 one possible statistical model is described for performing lines 6 and 7. The described model is a natural choice for the setup. It is also shown how it can be used very efficiently.

Section 1—Probabilistic Point Location in Equal Balls

The following section describes a simple algorithm for performing probabilistic point location in equal balls (PPLEB). In the traditional PLEB (point location in equal balls), one starts with a set of n points x, in 1R d and a specified ball of radius r. The algorithm is given O(poly(n)) preprocessing time to produce an efficient data structure. Then, given a query point x the algorithm is required to return all points x, such that $\|x-x_i\| \le r$. The set of points such that $\|x-x_i\| \le r$. geometrically lie within a ball of radius r surrounding the query x (see FIG. 23). This relation is referred to as $x_i$ being close to x or as $x_i$ and x being neighbors.

The problem of PPLEB and the problem of nearest neighbor search are two similar problems that received much attention in the academic community. In fact, these problems were among the first studied in the field of computational geometry. Many different methods cater to the case where the ambient dimension is small or constant. These partition the space in different ways and recursively search through the parts. These methods include KD-trees, cover-trees, and others. Although very efficient in low dimension, when the ambient dimension is high, they tend to perform very poorly. This is known as the "curse of dimensionality". Various approaches attempt to solve this problem while overcoming the curse of dimensionality. The algorithm used herein uses a simpler and faster version of the algorithm and can rely on Local Sensitive Hashing.

Section 1.1 Locality Sensitive Hashing

In the scheme of local sensitive hashing, one devises a family of hash functions H such that:

$$\Pr_{u \sim U}(u(x) \ne u(y) \mid \|x-y\| \le r) \equiv p$$

$$\Pr_{u \sim U}(u(x) \ne u(y) \mid \|x-y\| \ge 2r) \ge 2p$$

In words, the probability of x and y being mapped to the same value by h is significantly higher if they are close to each other.

For the sake of clarity, let us first deal with a simplified scenario where all incoming vectors are of the same length r' and r'>$\sqrt{2r}$. The reason for the latter condition will become clear later. First a random function u∈U is defined, which separates between x and y according to the angle between them. Let $\vec{u}$ be a random vector chosen uniformly from the unit sphere $S^{d-1}$ and let u(x)=sign($\vec{u}\cdot x$). It is easy to verify that $\Pr_{u \sim U}(u(x) \ne u(y)) = 0_{x,y}/\pi$. Moreover, for any points x, y, x', y' on a circle such that $\|x'-y'\| \le 2\|x-y\|$, $0_{x',y} \le 2 0_{x,y}$ is achieved. Defining p, the following equations are used:

$$\Pr_{u \sim U}(u(x) \ne u(y) \mid \|x-y\| \le r) \equiv p$$

$$\Pr_{u \sim U}(u(x) \ne u(y) \mid \|x-y\| \ge 2r) \ge 2p$$

The family of functions H is set to be a cross product oft independent copies of u, i.e. h(x)=[u1(x), . . . , $u_t(x)$]. Intuitively, one would like to have that if h(x)=h(y) then x and y are likely to be close to each other. Let us quantify that. First, compute the expected number of false positive mistakes $n_{fp}$. These are the cases for which h(x)=h(y) but $\|x-y\|>2r$. A value t is found for which $n_{fp}$ is no more than 1, i.e. one is not expected to be wrong.

$$E[n_{fp}] \le n(1-2p)^t \le 1$$

$$\rightarrow t \ge \log(1/n)/\log(1-2p)$$

Now, the probability that h(x)=h(y) given that they are neighbors is computed:

$$Pr(h(x)=h(y) \mid \|x-y\| \le r) \ge (1-p)^{\log(1/n)/\log(1-2p)} = (1/n)^{\log(1-p)/\log(1-2p)} \ge 1/\sqrt{n}.$$

Note here that one must have that 2p<1 which requires r'>$\sqrt{2r}$. This might not sound like a very high success probability. Indeed, $1/\sqrt{n}$ is significantly smaller than ½. The next section will describe how to boost this probability up to ½.

Section 1.2 The Point Search Algorithm

Each function h maps every point in space to a bucket. Define the bucket function $B_h : \mathbb{R}^d \rightarrow 2^{[n]}$ of a point x with respect to hash function h as $B_h(x) \equiv \{x_i | h(x_i) = h(x)\}$. The data structure maintained is m=O($\sqrt{n}$) instances of bucket functions $[Bh_1, \ldots, Bh_m]$. When one searches for a point x, the function returns $B(x) = \cup_i B_{h_j}(x)$. According to the previous section, there are two desired results:

$$Pr(x_i \in B(x) \mid \|x_i - x\| \le r) \ge ½$$

$$E[|B(x) \cap \{x_i \mid \|x-x_i\|>2r\}|] \le \sqrt{n}.$$

In other words, while with probability at least ½ each neighbor of x is found, one is not likely to find many non-neighbors.

Section 1.3 Dealing with Different Radii Input Vectors

Figure 11:
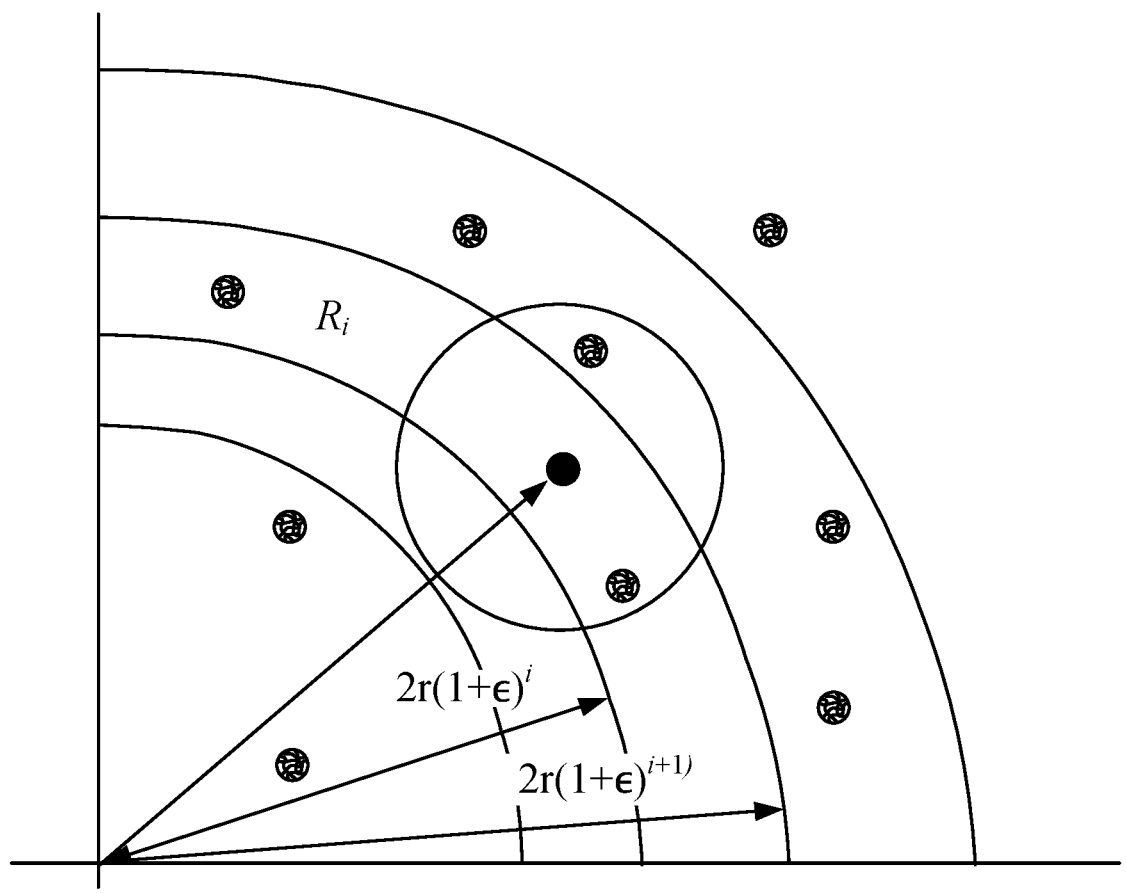
FIG. 11 is a chart illustrating a space divided into rings of exponentially growing width.

The previous sections only dealt with searching through vectors of the same length, namely r'. Now described is how one can use the construction as a building block to support a search in different radii. As seen in FIG. 11, the space is divided into rings of exponentially growing width. Ring i, denoted by $R_i$, includes all points $x_i$ such that $\|x_i\| \in [2r(1+\in)^i, 2r(1+\in)^{i+1}]$. Doing this achieves two ends. First, if $x_i$ and $x_j$ belong to the same ring, then $\|x_j\|/(1+\in) \le \|x_i\| \le \|x_j\|(1+\in)$. Second, any search can be performed in at most $1/\in$ such rings. Moreover, if the maximal length vector in the data set is r' then the total number of rings in the system is O(log (r'/r)).

Section 2 The Path Pursuit Problem

In the path pursuit problem, a fixed path in space is given along with the positions of a particle in a sequence of time points. The terms particle, cue, and point will be used interchangeably. The algorithm is required to output the position of the particle on the path. This is made harder by a few factors: the particle only follows the path approximately; the path can be discontinuous and intersect itself many times; both particle and path positions are given in a sequence of time points (different for each).

It is important to note that this problem can simulate tracking a particle on any number of paths. This is simply done by concatenating the paths into one long path and interpreting the resulting position as the position on the individual paths.

Figure 12:
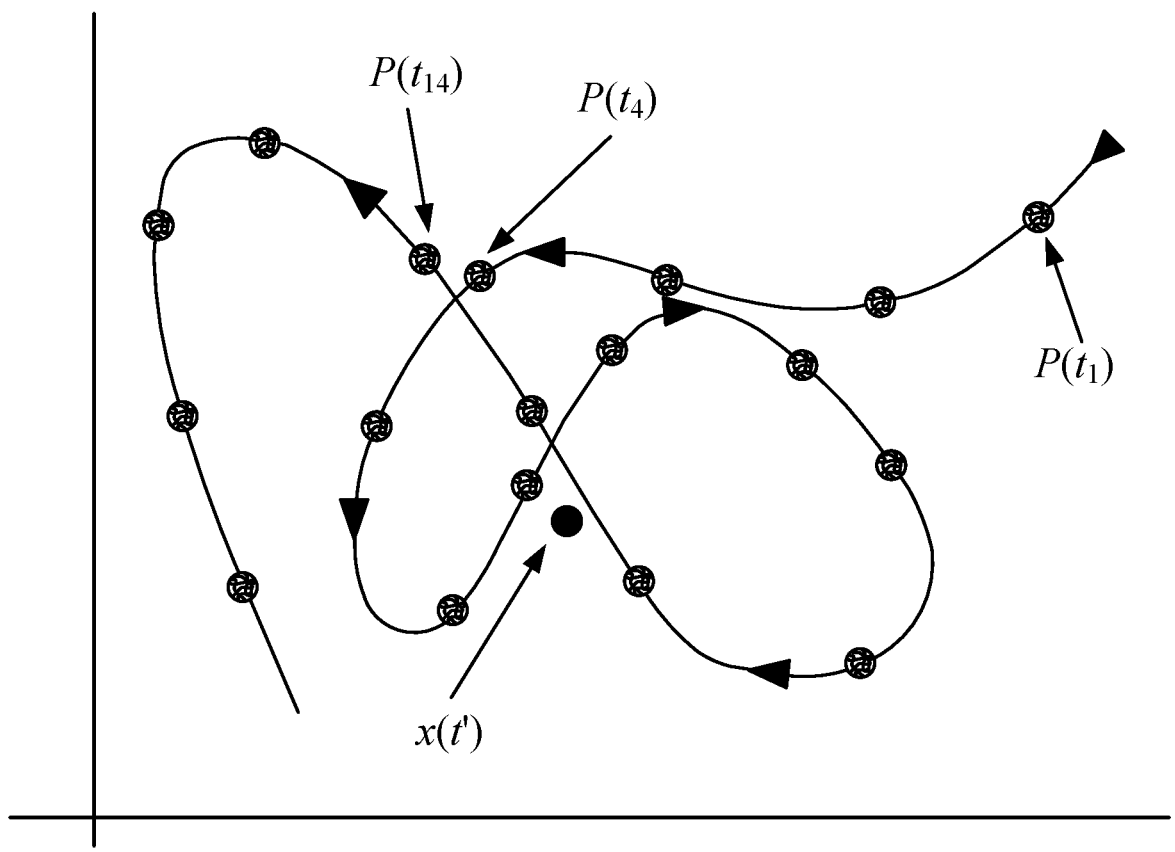
FIG. 12 is a chart illustrating self-intersecting paths and a query point.

More precisely, let path P be parametric curve P: $\mathbb{R} \to \mathbb{R}^d$. The curve parameter will be referred to as the time. The points on the path that are known to us are given in arbitrary time points $t_i$, i.e. n pairs $(t_i, P(t_i))$ are given. The particle follows the path but its positions are given in different time points, as shown in FIG. 12. Further, m pairs $(t'_j, x(t'_j))$ are given, where $x(t'_j)$ is the position of the particle in time $t'_j$.

Section 2.1 Likelihood Estimation

Since the particle does not follow the path exactly and since the path can intersect itself many times it is usually impossible to positively identify the position on the path the particle is actually on. Therefore, a probability distribution is computed on all possible path locations. If a location probability is significantly probable, the particle position is assumed to be known. The following section describes how this can be done efficiently.

If the particle is following the path, then the time difference between the particle time stamp and the offset of the corresponding points on P should be relatively fixed. In other words, if x(t') is currently in offset t on the path then it should be close to P(t). Also, τ seconds ago it should have been in offset t−τ. Thus x(t'−τ) should be close to P(t−τ) (note that if the particle is intersecting the path, and x(t') is close to P(t) temporarily, it is unlikely that x(t'−τ) and P(t−τ) will also be close). Define the relative offset as $\Delta = t - t'$. Notice that as long as the particle is following the path the relative offset $\Delta$ remains unchanged. Namely, x(t') is close to P(t'+$\Delta$).

The maximum likelihood relative offset is obtained by calculating:

$$\Delta = \underset{\delta}{\operatorname{argmax}} \; Pr(x(t'_m), x(t'_{m-1}), \ldots, x(t'_1) \mid P, \delta)$$

In words, the most likely relative offset is the one for which the history of the particle is most likely. This equation however cannot be solved without a statistical model. This model must quantify: how tightly x follows the path; how likely it is that x jumps between locations; and how smooth the path and particle curves are between the measured points.

Section 2.2 Time Discounted Binning

Now described is a statistical model for estimating the likelihood function. The model makes the assumption that the particle's deviation away from the path distributes normally with standard deviation ar. It also assumes that at any given point in time, there is some non-zero probability the particle will abruptly switch to another path. This is manifested by an exponential discount with time for past points. Apart for being a reasonable choice for a modeling point of view this model also has the advantage of being efficiently updateable. For some constant time unit 1: set the likelihood function to be proportional to $f$ which is defined as follows:

$$f_m(\lfloor \delta/\tau \rfloor) = \sum_{j=1}^{m} \sum_{i=1}^{n} e^{-\left(\frac{\|x(t'_j)-P(t_i+\delta)\|}{\alpha r}\right)^2} (1-\zeta)^{t'_i - t'_j}.$$

Here $\alpha \ll 1$ is a scale coefficient and $\zeta > 0$ is the probability that the particle will jump to a random location on the path in a given time unit.

Updating the function $f$ efficiently can be achieved using the following simple observation.

$$f_m(\lfloor \delta/\tau \rfloor) = \sum_{i=1}^{n} e^{-\left(\frac{\|x(t'_m)-P(t_i+\delta)\|}{\alpha r}\right)^2} + f_{m-1}(\lfloor \delta/\tau \rfloor)(1-\zeta)^{t'_m - t'_{m-1}}$$

Moreover, since $\alpha \ll 1$, if $\|x(t'_m) - P(t_i)\| \ge r$, the following occurs:

$$e^{-\left(\frac{\|x(t'_m)-P(t_i)\|}{\alpha r}\right)^2} \approx 0.$$

This is an important property of the likelihood function since the sum update can now performed only over the neighbors of $x(t'_j)$ and not the entire path. Denote by S the set of $(t_i, P(t_i))$ such that $\|x(t'_m) - P(t_j)\| \le r$. The follow equation occurs:

$$f_m(\lfloor \delta/\tau \rfloor) = \sum_{(t_i, P(t_j)) \in S \wedge \lfloor (t'_m - t_i)/\tau \rfloor = \lfloor \delta/\tau \rfloor} e^{-\left(\frac{\|x(t'_m)-P(t_i)\|}{\alpha r}\right)^2} + f_{m-1}(\lfloor \delta \rfloor)(1-\zeta)^{t'_m - t'_{m-1}}$$

This is described in Algorithm 2.2 below. The term $f$ is used as a sparse vector that receives also negative integer indices. The set S is the set of all neighbors of $x(t_i)$ on the path and can be computed quickly using the PPLEB algorithm. It is easy to verify that if the number of neighbors of $x(t_i)$ is bounded by some constant $n_{near}$ then the number of non-zeros in the vector $f$ is bounded by $n_{near}/\zeta$ which is only a constant factor larger. The final stage of the algorithm is to output a specific value of δ if $f(\lfloor \delta/\tau \rfloor)$ is above some threshold value.

---

Algorithm 2 Efficient likelihood update.

1:      $f \leftarrow 0$
2:      while $(t_j', x(t_j')) \in$ INPUT do
3:        $f \leftarrow (1 - \zeta)^{t_j'-1}f$
4:        $S \leftarrow \{(t_i, P(t_i)) \mid \|x(t_j') - P(t_i)\| \leq r\}$
5:        for $(t_i, P(t_i)) \in S$ do
6:          $\delta \leftarrow t_j' - t_i$
7:

$$f(\lfloor \delta/\tau \rfloor) \leftarrow f(\lfloor \delta/\tau \rfloor) + e^{-\left(\frac{\|x(t_j)-P(t')\|}{\sigma r}\right)^2}$$

8:        end for
9:        Set all f values below threshold $\in$ to zero.
10:     end while

---

Figure 8:
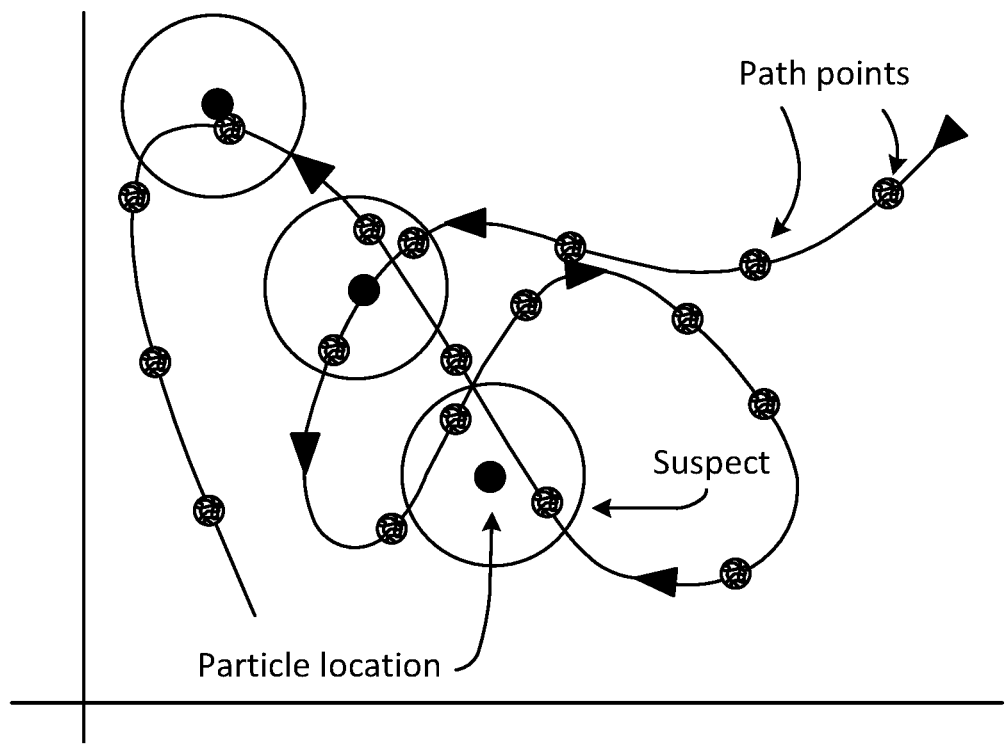
FIG. 8 is a chart illustrating point locations and the path points around them.

FIG. 8 gives three consecutive point locations and the path points around them. Note that neither the bottom point nor middle one alone would have been sufficient to identify the correct part of the path. Together, however, they are. Adding the top point increases the certainty that the particle is indeed of the final (left) curve of the path.

Figure 9:
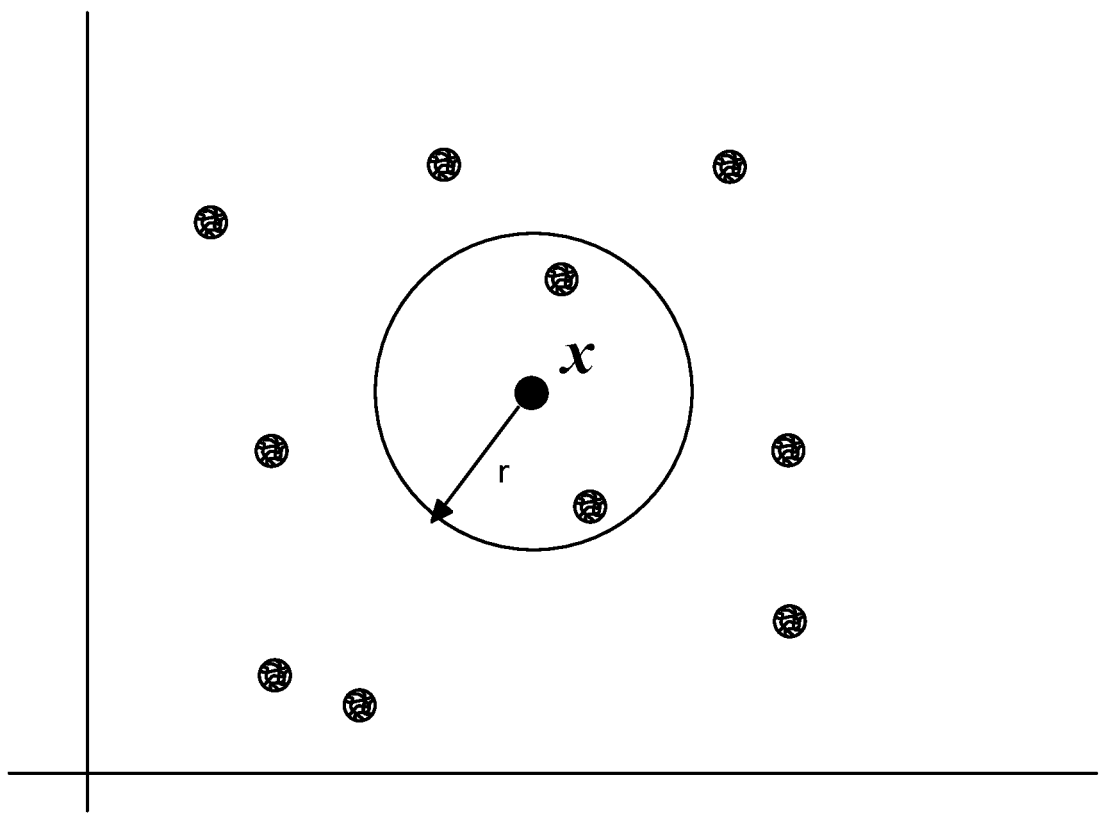
FIG. 9 is a chart illustrating a set of points that lie within distance from a query point.

In FIG. 9, given a set of n (grey) points, the algorithm is given a query point (black) and returns the set of points that lie within distance r from it (the points inside the circle). In the traditional setting, the algorithm must return all such points. In the probabilistic setting each such point should be returned only with some constant probability.

Figure 10:
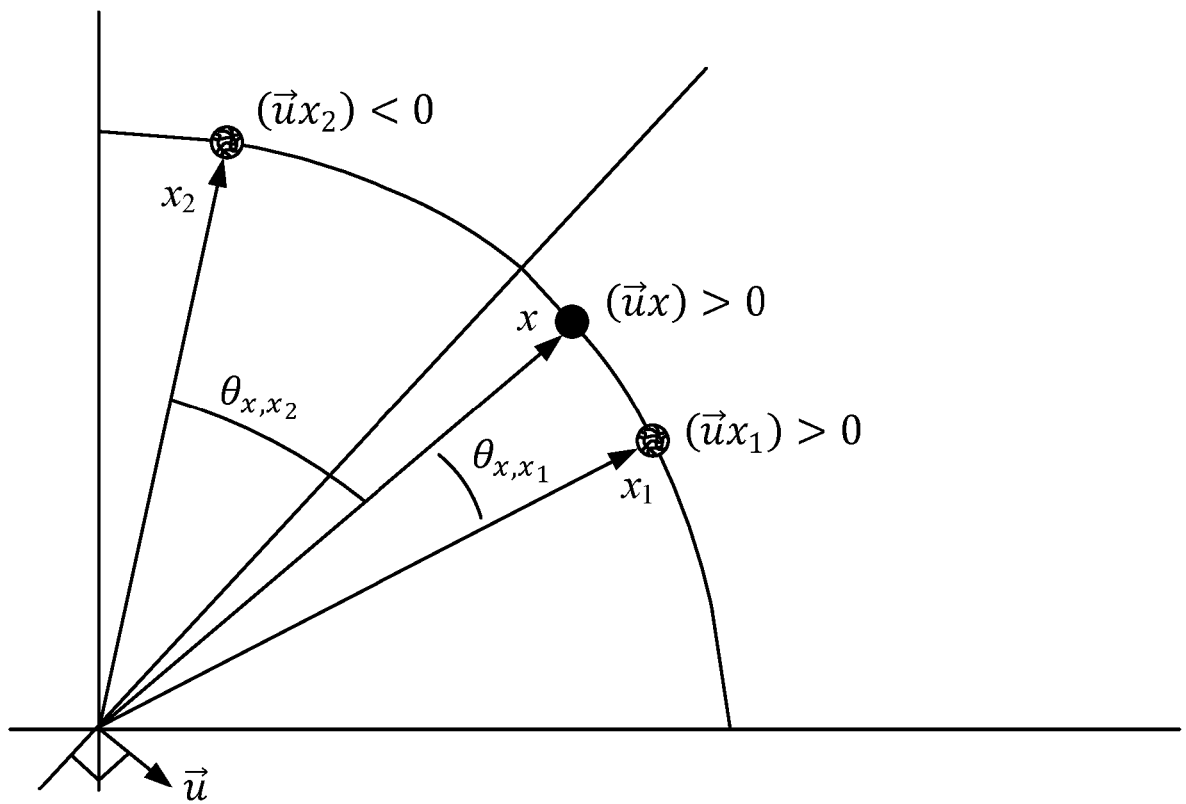
FIG. 10 is a chart illustrating possible point values.

FIG. 10 illustrates the values of $u(x_1)$, $u(x_2)$, and $u(x)$. Intuitively, the function u gives different values to $x_1$ and $x_2$ if the dashed line passes between them and the same value otherwise. Passing the dashed line in a random direction ensures that the probability of this happening is directly proportional to angle between $x_1$ and $x_2$.

FIG. 11 shows that by dividing the space into rings such that ring $R_i$ is between radius $2r(1+\in)^i$ and $2r(1+\in)^{i+1}$, it can be made sure that any two vectors within a ring are the same length up to $(1+\in)$ factors and that any search is performed in at most $1/\in$ rings.

FIG. 12 shows a self-intersecting paths and a query point (in black). It illustrates that without the history of the particle positions it is impossible to know where it is on the path.

Figure 13:
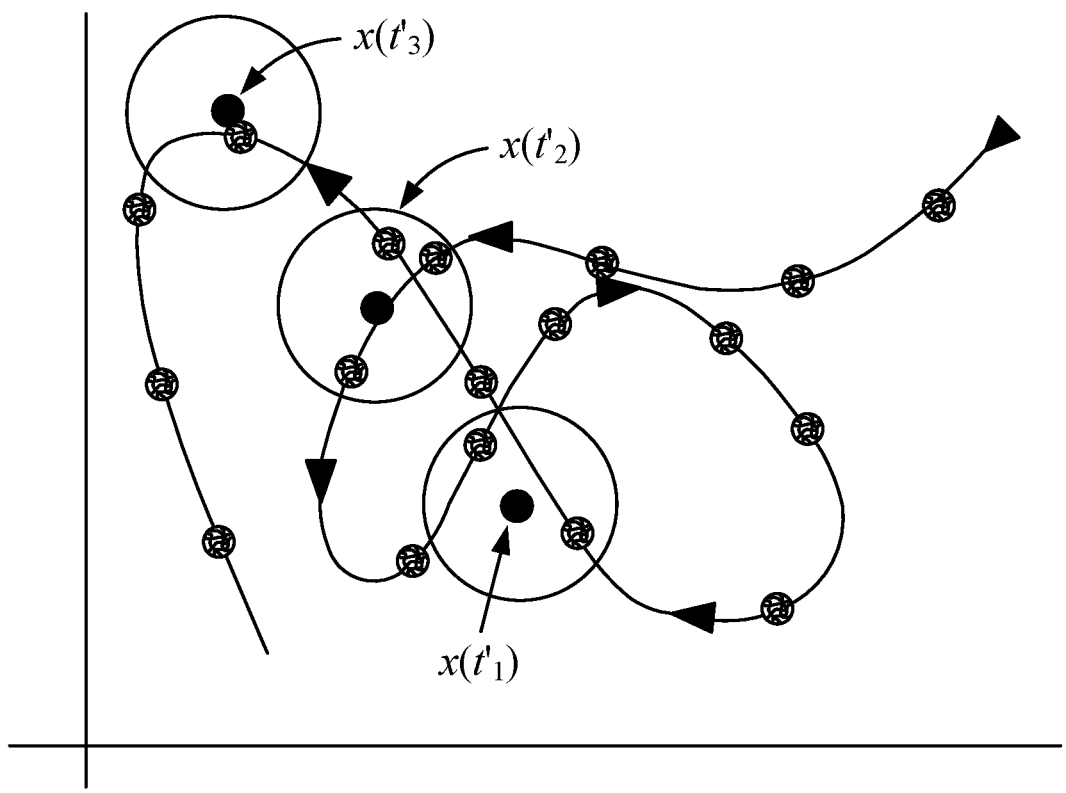
FIG. 13 is a chart illustrating three consecutive point locations and the path points around them.

FIG. 13 gives three consecutive point locations and the path points around them. Note that neither $x(t_1)$ nor $x(t_2)$ alone would have been sufficient to identify the correct part of the path. Together however they are. Adding $x(t_3)$ increases the certainty that the particle is indeed of the final (left) curve of the path.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific examples thereof, but those skilled in the art will recognize that the invention is not limited thereto. Various features and aspects of the above-described invention may be used individually or jointly. Further, examples can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
receiving, by a server, a reference data set associated with a media segment, wherein the server is configured to identify an unidentified media segment by matching an unidentified data set with the reference data set, and wherein the unidentified data set is associated with the unidentified media segment;
storing the reference data set in a reference database;
receiving popularity data indicating a popularity of the media segment, wherein the popularity data includes values associated with at least one or more of viewing information of the media segment, rating information of the media segment, or information associated with a posted message on a remote source, and wherein the posted message is associated with the media segment;
determining a deletion time for the reference data set, wherein the deletion time is determined by calculating a representative value of two or more values of the popularity data, the representative value being one of an average, a mean, or a median of the two or more of the values of the popularity data; and
deleting the reference data set from the reference database, wherein the reference data set is deleted after the deletion time has expired.

2. The computer-implemented method of claim 1, further comprising:
adding the reference data set to a backup database when the reference data set is deleted from the reference database, wherein the server is configured to search the backup database after the reference database for a data set matching the unidentified data set.

3. The computer-implemented method of claim 1, wherein the reference data set includes pixel data or audio data for a frame of the media segment.

4. The computer-implemented method of claim 1, wherein the information associated with the posted message on the remote source includes at least one or more of a number of posted messages on the remote source, a number of the posted messages that are positive, a number of the posted messages that are negative, a number of positive indications to the posted message, a number of reposts of the posted message, or a number of views of the posted message, and wherein the posted messages are associated with the media segment.

5. The computer-implemented method of claim 1, wherein the viewing information includes a number of times the media segment has been identified by the server.

6. A system comprising:
one or more processors; and
a non-transitory computer-readable medium containing instructions that, when executed by the one or more processors, cause the one or more processors to perform operations including:
receiving, by a server, a reference data set associated with a media segment, wherein the server is configured to identify an unidentified media segment by matching an unidentified data set with the reference data set, and wherein the unidentified data set is associated with the unidentified media segment;
storing the reference data set in a reference database;
receiving popularity data indicating a popularity of the media segment, wherein the popularity data includes values associated with at least one or more of viewing information of the media segment, rating information of the media segment, or information associated with a posted message on a remote source, and wherein the posted message is associated with the media segment;
determining a deletion time for the reference data set, wherein the deletion time is determined by calculating a representative value of two or more values of the popularity data, the representative value being one of an average, a mean, or a median of the two or more of the values of the popularity data; and
deleting the reference data set from the reference database, wherein the reference data set is deleted after the deletion time has expired.

7. The system of claim 6, further comprising instructions that, when executed by the one or more processors, cause the one or more processors to perform operations including:
add the reference data set to a backup database when the reference data set is deleted from the reference database, wherein the server is configured to search the backup database after the reference database for a data set matching the unidentified data set.

8. The system of claim 6, wherein the reference data set includes pixel data or audio data for a frame of the media segment.

9. The system of claim 8, wherein the information associated with the posted message on the remote source includes at least one or more of a number of posted messages on the remote source, a number of the posted messages that are positive, a number of the posted messages that are negative, a number of positive indications to the posted message, a number of reposts of the posted message, or a number of views of the posted message, and wherein the posted messages are associated with the media segment.

10. The system of claim 8, wherein the viewing information includes a number of times the media segment has been identified by the server.

11. A computer-program product tangibly embodied in a non-transitory machine-readable storage medium, including instructions that, when executed by the one or more processors, cause the one or more processors to:
receive, by a server, a reference data set associated with a media segment, wherein the server is configured to identify an unidentified media segment by matching an unidentified data set with the reference data set, and wherein the unidentified data set is associated with the unidentified media segment;
store the reference data set in a reference database;
receive popularity data indicating a popularity of the media segment, wherein the popularity data includes values associated with at least one or more of viewing information of the media segment, rating information of the media segment, or information associated with a posted message on a remote source, and wherein the posted message is associated with the media segment;
determine a deletion time for the reference data set, wherein the deletion time is determined by calculating a representative value of two or more values of the popularity data, the representative value being one of an average, a mean, or a median of the two or more of the values of the popularity data; and
delete the reference data set from the reference database, wherein the reference data set is deleted after the deletion time has expired.

12. The computer-program product of claim 11, further including instructions that, when executed by the one or more processors, cause the one or more processors to:
add the reference data set to a backup database when the reference data set is deleted from the reference database, wherein the server is configured to search the backup database after the reference database for a data set matching the unidentified data set.

13. The computer-program product of claim 11, wherein the reference data set includes pixel data or audio data for a frame of the media segment.

14. The computer-program product of claim 11, wherein the information associated with the posted message on the remote source includes at least one or more of a number of posted messages on the remote source, a number of the posted messages that are positive, a number of the posted messages that are negative, a number of positive indications to the posted message, a number of reposts of the posted message, or a number of views of the posted message, and wherein the posted messages are associated with the media segment.

15. The computer-implemented method of claim 1, wherein determining a deletion time for the reference data set comprises using a respective weight associated with one or more of the values of the popularity data.

16. The system of claim 8, wherein determining a deletion time for the reference data set comprises using a respective weight associated with one or more of the values of the popularity data.

17. The computer-program product of claim 11, wherein determining a deletion time for the reference data set comprises using a respective weight associated with one or more of the values of the popularity data.

18. The computer-program product of claim 11, wherein the viewing information includes a number of times the media segment has been identified by the server.

* * * * *